(12) United States Patent
Takei

(10) Patent No.: US 11,675,209 B2
(45) Date of Patent: Jun. 13, 2023

(54) OPTICAL UNIT WITH SHAKE CORRECTION FUNCTION

(71) Applicant: NIDEC SANKYO CORPORATION, Nagano (JP)

(72) Inventor: Hiromitsu Takei, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 369 days.

(21) Appl. No.: 16/988,982

(22) Filed: Aug. 10, 2020

(65) Prior Publication Data

US 2021/0041716 A1 Feb. 11, 2021

(30) Foreign Application Priority Data

Aug. 9, 2019 (JP) .............................. JP2019-147314

(51) Int. Cl.
*G02B 27/64* (2006.01)
*G03B 5/06* (2021.01)

(52) U.S. Cl.
CPC .............. *G02B 27/646* (2013.01); *G03B 5/06* (2013.01); *G03B 2205/0023* (2013.01); *G03B 2205/0069* (2013.01)

(58) Field of Classification Search
CPC . G02B 27/646; G03B 5/06; G03B 2205/0023
See application file for complete search history.

(56) References Cited

U.S. PATENT DOCUMENTS

| | | | | |
|---|---|---|---|---|
| 11,460,714 B2 * | 10/2022 | Takei | ................ | G02B 27/646 |
| 2013/0182325 A1 * | 7/2013 | Minamisawa | ..... | H04N 5/23248 |
| | | | | 359/554 |
| 2016/0124242 A1 * | 5/2016 | Minamisawa | ......... | H04N 5/232 |
| | | | | 359/557 |
| 2016/0170227 A1 * | 6/2016 | Minamisawa | ....... | H04N 5/2257 |
| | | | | 359/557 |
| 2018/0173080 A1 * | 6/2018 | Enta | ..................... | H04N 5/2257 |
| 2018/0284477 A1 * | 10/2018 | Minamisawa | ......... | G03B 17/02 |
| 2019/0018258 A1 * | 1/2019 | Minamisawa | ....... | H04N 5/2253 |
| 2020/0174272 A1 * | 6/2020 | Minamisawa | ........... | G03B 5/04 |
| 2020/0310152 A1 * | 10/2020 | Minamisawa | ..... | H02K 41/0356 |
| 2020/0310153 A1 * | 10/2020 | Sue | ...................... | G02B 27/646 |
| 2021/0041715 A1 * | 2/2021 | Takei | ................... | G02B 27/646 |
| 2021/0041717 A1 * | 2/2021 | Takei | ..................... | G03B 30/00 |

FOREIGN PATENT DOCUMENTS

JP 2018169499 A 11/2018

* cited by examiner

*Primary Examiner* — Cara E Rakowski
(74) *Attorney, Agent, or Firm* — Cantor Colburn LLP

(57) ABSTRACT

In an optical unit with a shake correction function, a first flexible printed board and a second flexible printed board may extend in a +X direction perpendicular to an optical axis from a chassis surrounding the outer circumference side of a movable body and a gimbal structure. A cover may house the chassis and bend portions of the first flexible printed board and the second flexible printed board. The cover may include an image-side cover and an object-side cover, and the first flexible printed board and the second flexible printed board may include securing portions that are secured to the image-side cover. The object-side cover may include a first cover covering the chassis and a second cover covering the first flexible printed board and the second flexible printed board. The first cover may include a cover portion covering the coupling position of the chassis and the second cover.

16 Claims, 15 Drawing Sheets

OPTICAL UNIT WITH SHAKE CORRECTION FUNCTION

CROSS REFERENCE TO RELATED APPLICATION

The present invention claims priority under 35 U.S.C. § 119 to Japanese Application No. 2019-147314 filed on Aug. 9, 2019, the entire content of which is incorporated herein by reference.

BACKGROUND

Field of the Invention

At least an embodiment of the present invention relates to an optical unit with a shake correction function to rotate an imaging module so as to correct the shake.

Description of the Related Art

In some optical units installed in mobile terminals or mobile objects, a movable body including an optical module is swayed around an optical axis or an axis intersecting with the optical axis to correct the shake so as to suppress the blur of images captured during the movement of the mobile terminal or the mobile object. Japanese Patent Application Publication No. 2018-169499 discloses this type of optical unit with a shake correction function.

The optical unit with a shake correction function disclosed in Japanese Patent Application Publication No. 2018-169499 includes: a movable body including an optical module; a securing body; and a sway support structure that supports the movable body rotatably around the rotation axis intersecting with the optical axis with respect to the securing body. A flexible printed board coupled to the optical module extends from the movable body. The flexible printed board extends first in a U-shaped bended form in the direction of the optical axis at the rear side of the movable body and then extends outside of the securing body surrounding the movable body in the radial direction.

In order to reduce the thickness of an optical unit with a shake correction function, there is a disclosed structure in which a flexible printed board extends to the outer circumference side of the movable body without extending to the rear side of the movable body with in the direction of the optical axis. The securing body includes a chassis surrounding the movable body and also includes a wiring housing portion that houses the flexible printed board extending to the outer circumference side of the chassis. The flexible printed board extends in a bended form inside the wiring housing portion.

In a case where the flexible printed board extends to the outer circumference side from the chassis surrounding the movable body, there is a possibility that foreign matter enters from an opening through which the flexible printed board extends. Even in a case where a wiring housing portion is provided to house the flexible printed board, foreign matter may enter through the gap between the chassis and the wiring housing portion, which results in a failure.

In consideration of the above-described point, at least an embodiment of the present invention has an object to suppress the entry of foreign matter in an optical unit with a shake correction function.

SUMMARY

In order to solve the above-described disadvantage, an optical unit with a shake correction function according to at least an embodiment of the present invention may include a movable body including a lens, a gimbal structure to support the movable body rotatably around a first axis intersecting with an optical axis of the lens and rotate around a second axis intersecting with the optical axis and the first axis, a securing body to support the movable body via the gimbal structure, and a flexible printed board extending from the movable body in a first direction intersecting with the optical axis. The securing body may include a chassis to surround an outer circumference side of the movable body and the gimbal structure, and a cover to house the chassis and the flexible printed board extending to a side of the chassis in the first direction. The flexible printed board may include a securing portion secured to the cover and a bend portion extending in a bended form between the securing portion and the movable body.

According to at least an embodiment of the present invention, the flexible printed board may extend from the chassis surrounding the movable body and the gimbal structure in the first direction intersecting with the optical axis, and the securing body includes the cover that houses the chassis and the flexible printed board extending to the outer circumference side of the chassis. Therefore, it is possible to prevent foreign matter from entering the inside of the cover. The flexible printed board may include the securing portion that is secured to the cover and includes the bend portion extending in a bended form between the securing portion and the movable body; thus, it is possible to suppress an increase in the rotational load for rotating the movable body due to the elasticity of the flexible printed board.

According to at least an embodiment of the present invention, the cover may include an image-side cover to cover the chassis and the flexible printed board from an image side in a direction of the optical axis and an object-side cover to cover the chassis and the flexible printed board from an object side with respect to the direction of the optical axis. The object-side cover may include a first cover to cover the chassis and a second cover, disposed on the side of the chassis in the first direction, to cover the flexible printed board. An end in the first direction of the first cover may include a cover portion to cover a coupling position of the chassis and the second cover. Thus, it is possible to prevent the entry of foreign matter through the coupling position of the second cover covering the flexible printed board and the chassis.

According to at least an embodiment of the present invention, the image-side cover and the first cover may be made of a metal, the second cover may be made of a resin, and an end of the second cover, which end is opposite to the chassis, may include a recessed portion that is provided in an area covered with the cover portion and is recessed with a depth substantially equal to a thickness of the first cover. Therefore, the coupling area between the first cover and the second cover has an engagement structure. Thus, foreign matter is unlikely to enter through the coupling area between the first cover and the second cover.

In this case, an adhesive reservoir may be provided at a coupling position of the first cover and the second cover, and the adhesive reservoir may include a cutout portion formed by cutting out an edge of the cover portion. Thus, an adhesive may be placed in the adhesive reservoir when the first cover and the second cover are secured to each other with the adhesive.

According to at least an embodiment of the present invention, the chassis may include a center side plate facing in the first direction and a first-side side plate disposed on a first side of the center side plate in a circumferential direction; and a second-side side plate disposed on a second side of the center side plate in the circumferential direction. The first-side side plate may be inclined to the first side in the circumferential direction with respect to the center side plate, and the second-side side plate may be inclined to the second side in the circumferential direction with respect to the center side plate. The second cover may include a first inclined surface facing the first-side side plate and a second inclined surface facing the second-side side plate. An area where the cover portion covers the coupling position of the chassis and the second cover may include a first labyrinth structure including an area where the first-side side plate is opposed to the first inclined surface; and a second labyrinth structure including an area where the second-side side plate is opposed to the second inclined surface. Therefore, it is possible to provide a labyrinth structure at the coupling position of the chassis and the cover. Thus, it is possible to prevent the entry of foreign matter.

According to at least an embodiment of the present invention, the image-side cover may include a first elastic engagement portion extending along a side plate of the chassis, and the chassis may include a first engagement portion to engage with the first elastic engagement portion. This enables securing with the snap-fit structure so that the image-side cover and the chassis may be easily secured to each other.

According to at least an embodiment of the present invention, the image-side cover may include a second elastic engagement portion extending along a side surface of the second cover, and the second cover may include a second engagement portion to engage with the second elastic engagement portion. This enables securing with the snap-fit structure so that the image-side cover and the second cover may be easily secured to each other.

According to at least an embodiment of the present invention, the second cover may include an upper plate portion facing the image-side cover and a hook provided on an edge of the upper plate portion which edge is opposite to the chassis. The chassis may include a fitting portion into which the hook is fitted. Therefore, the hook is fitted into the fitting portion so that the chassis and the second cover may be coupled to each other, and thus it is easy to secure the chassis and the second cover to each other.

According to at least an embodiment of the present invention, the flexible printed board may extend from the chassis surrounding the movable body in the first direction, and the securing body may include the cover that houses not only the chassis but also the flexible printed board extending to the outer circumference side of the chassis. Thus, it is possible to suppress the entry of foreign matter through the area where the flexible printed board extends. The flexible printed board may include the securing portion that is secured to the cover and the bend portion extending in a bended form between the securing portion and the movable body; thus, it is possible to suppress an increase in the rotational load for rotating the movable body due to the elasticity of the flexible printed board.

BRIEF DESCRIPTION OF THE DRAWINGS

Embodiments will now be described, by way of example only, with reference to the accompanying drawings which are meant to be exemplary, not limiting, and where like elements are numbered alike in several Figures, in which.

DETAILED DESCRIPTION

An optical unit with a shake correction function according to at least an embodiment of the present invention is described below with reference to the drawings.

Overall Configuration

Figure 1:
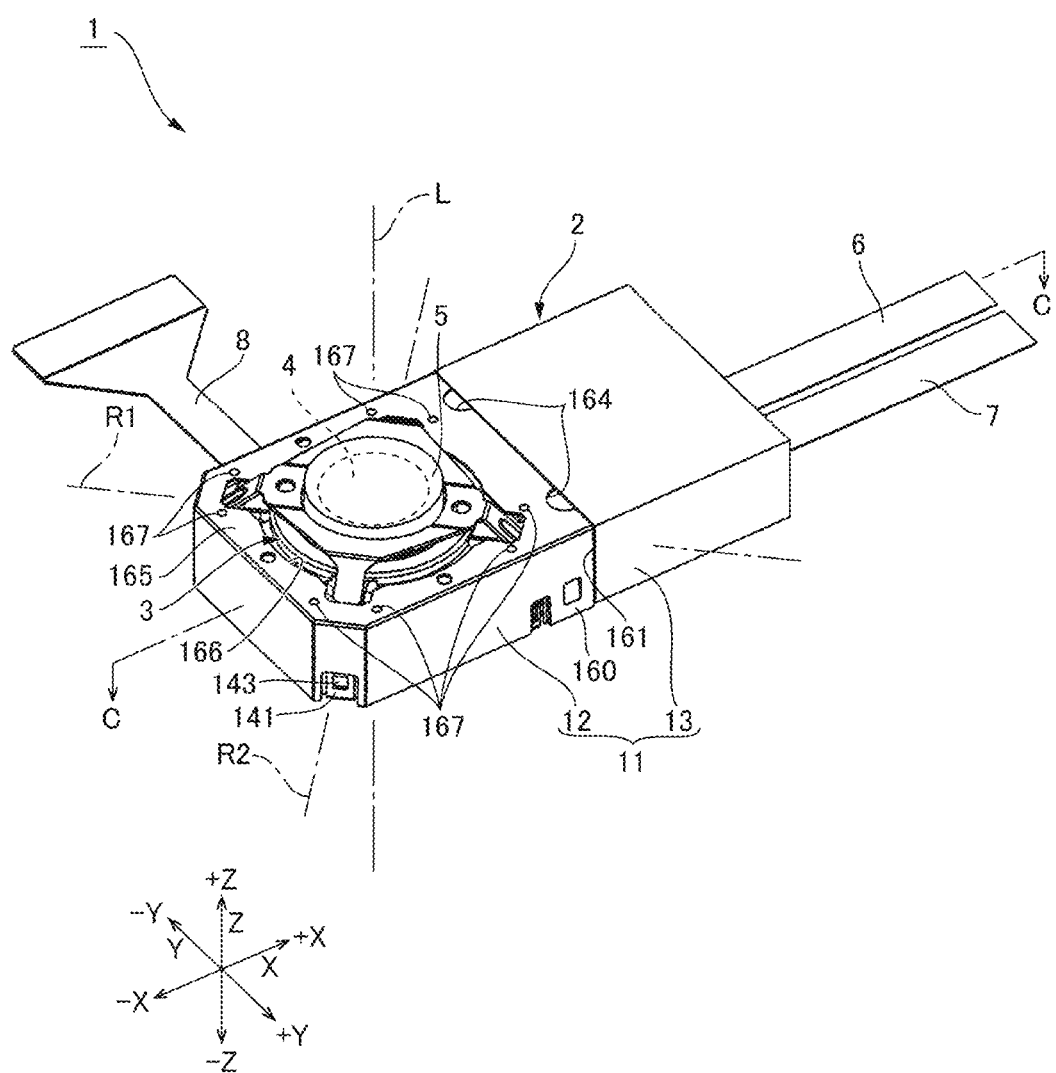
FIG. 1 is a perspective view of an optical unit with a shake correction function.
Figure 2:
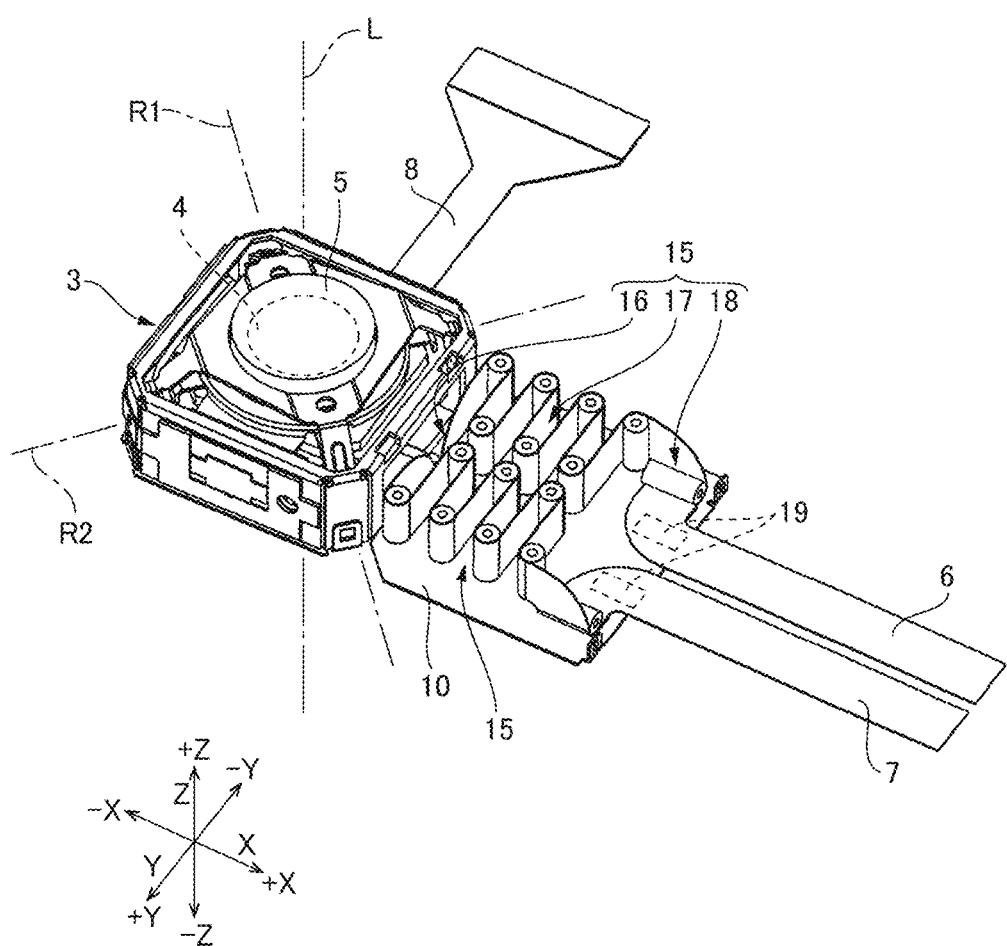
FIG. 2 is a perspective view of the optical unit with a shake correction function from which an object-side cover has been removed.
Figure 3:
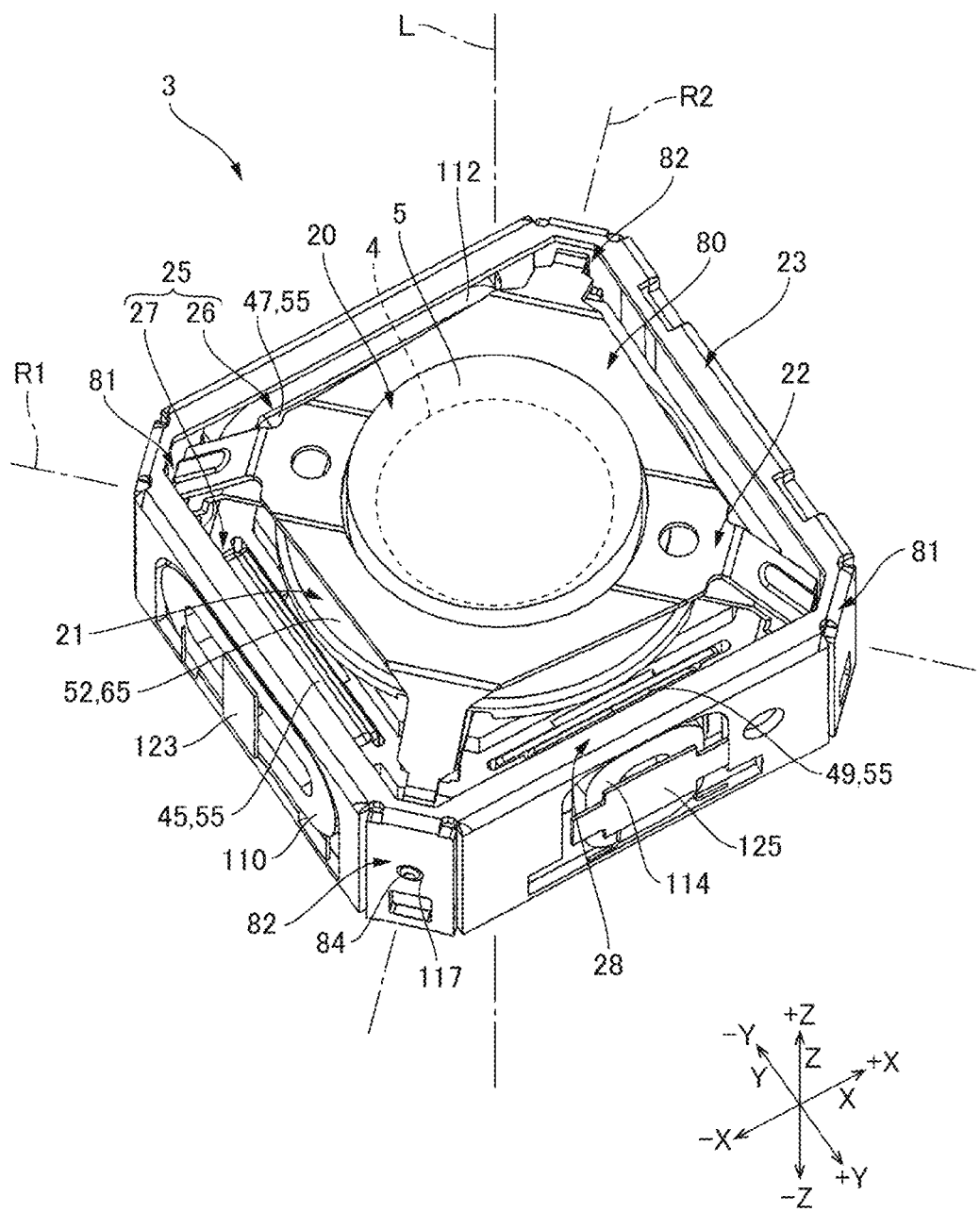
FIG. 3 is a perspective view of an optical-unit main body.
Figure 4:
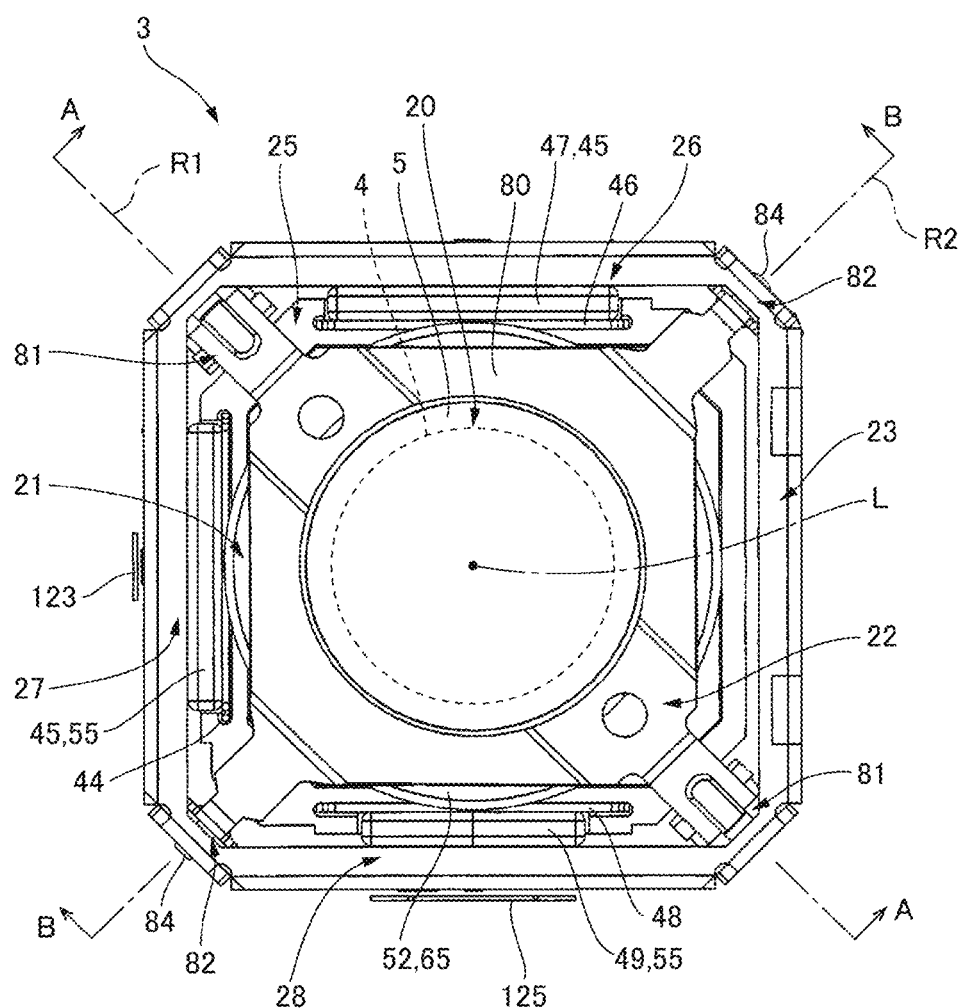
FIG. 4 is a plan view of the optical-unit main body when viewed in an optical axis direction.
Figure 5:
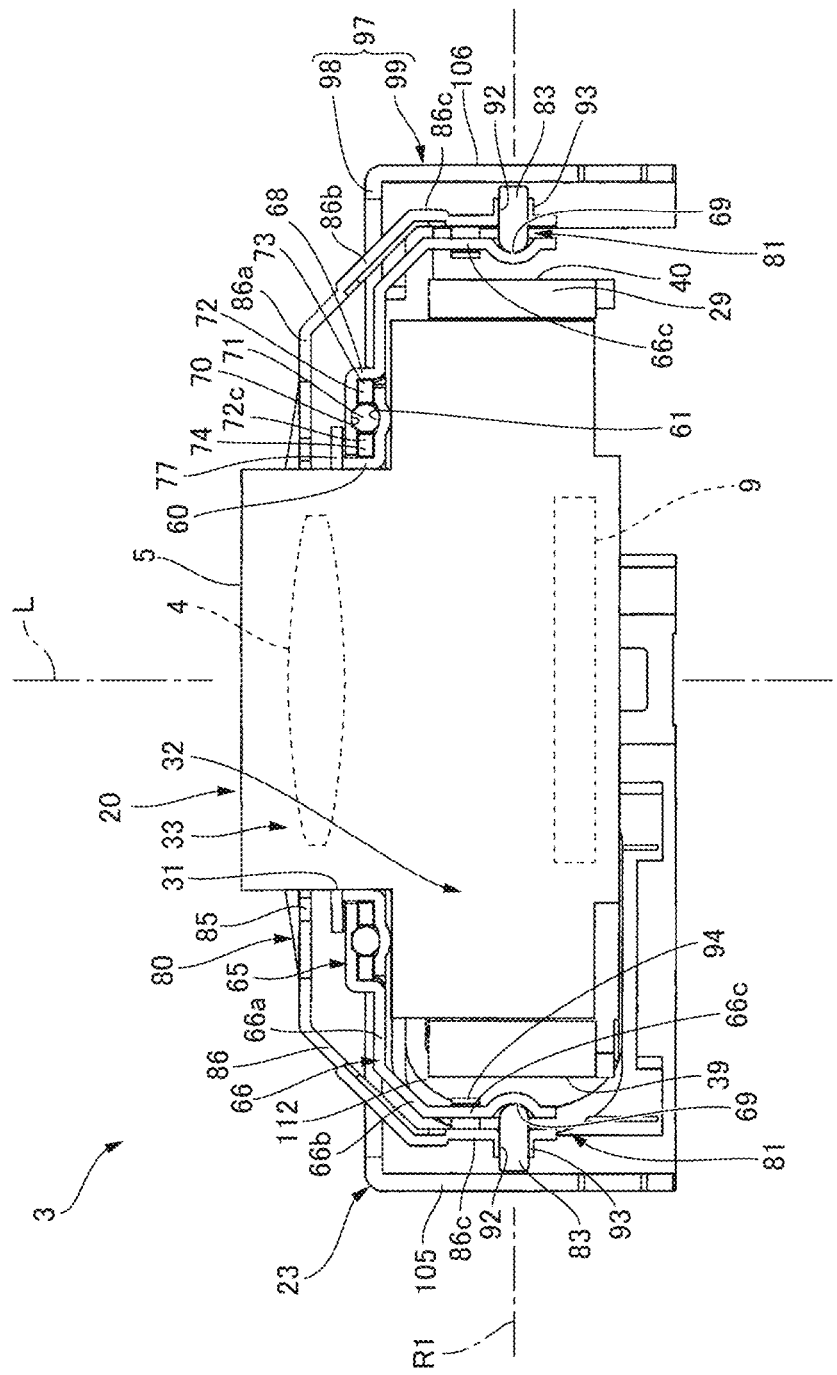
FIG. 5 is a cross-sectional view taken along the line A-A in FIG. 4.
Figure 6:
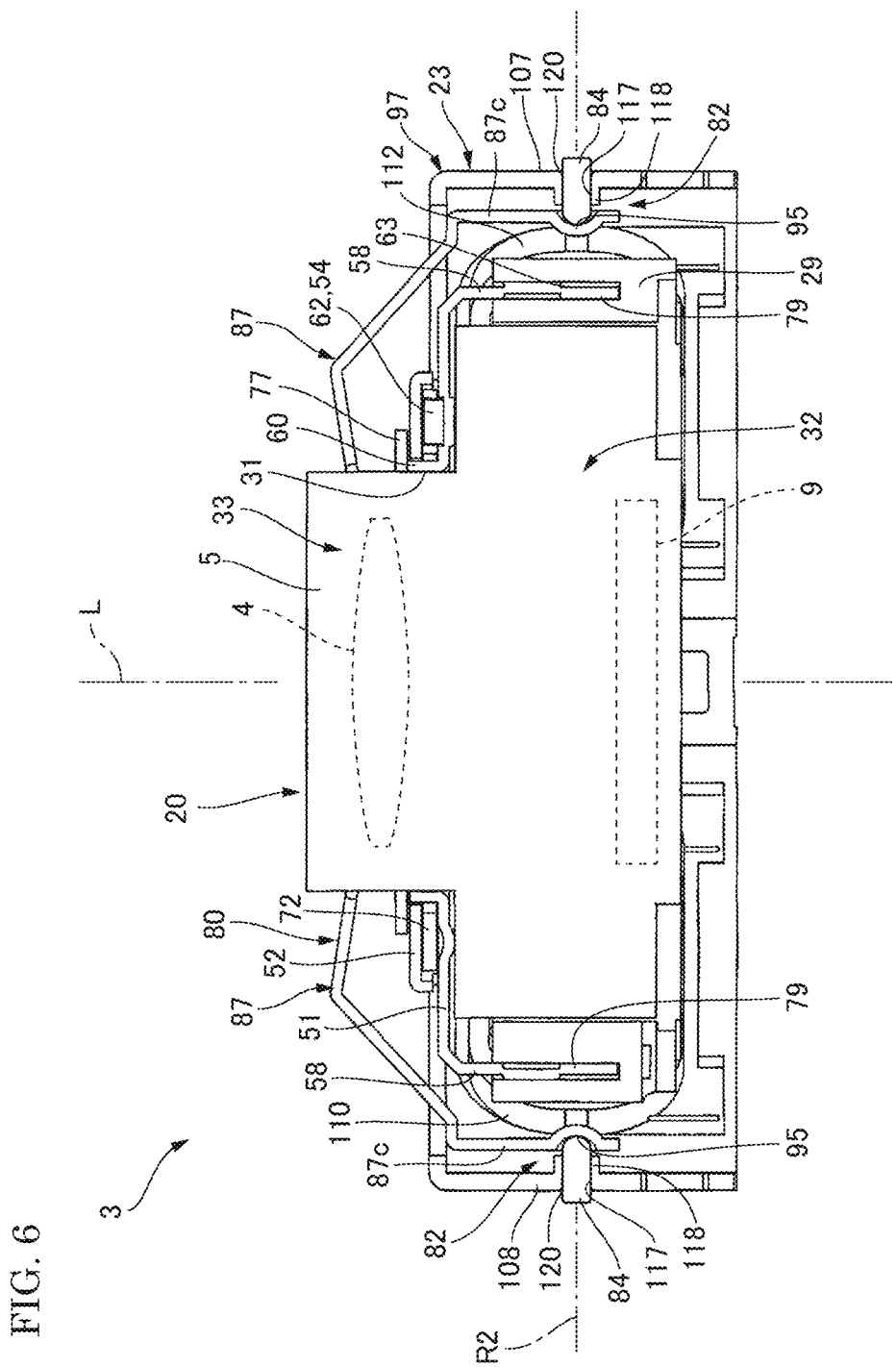
FIG. 6 is a cross-sectional view taken along the line B-B in FIG. 4.
Figure 7:
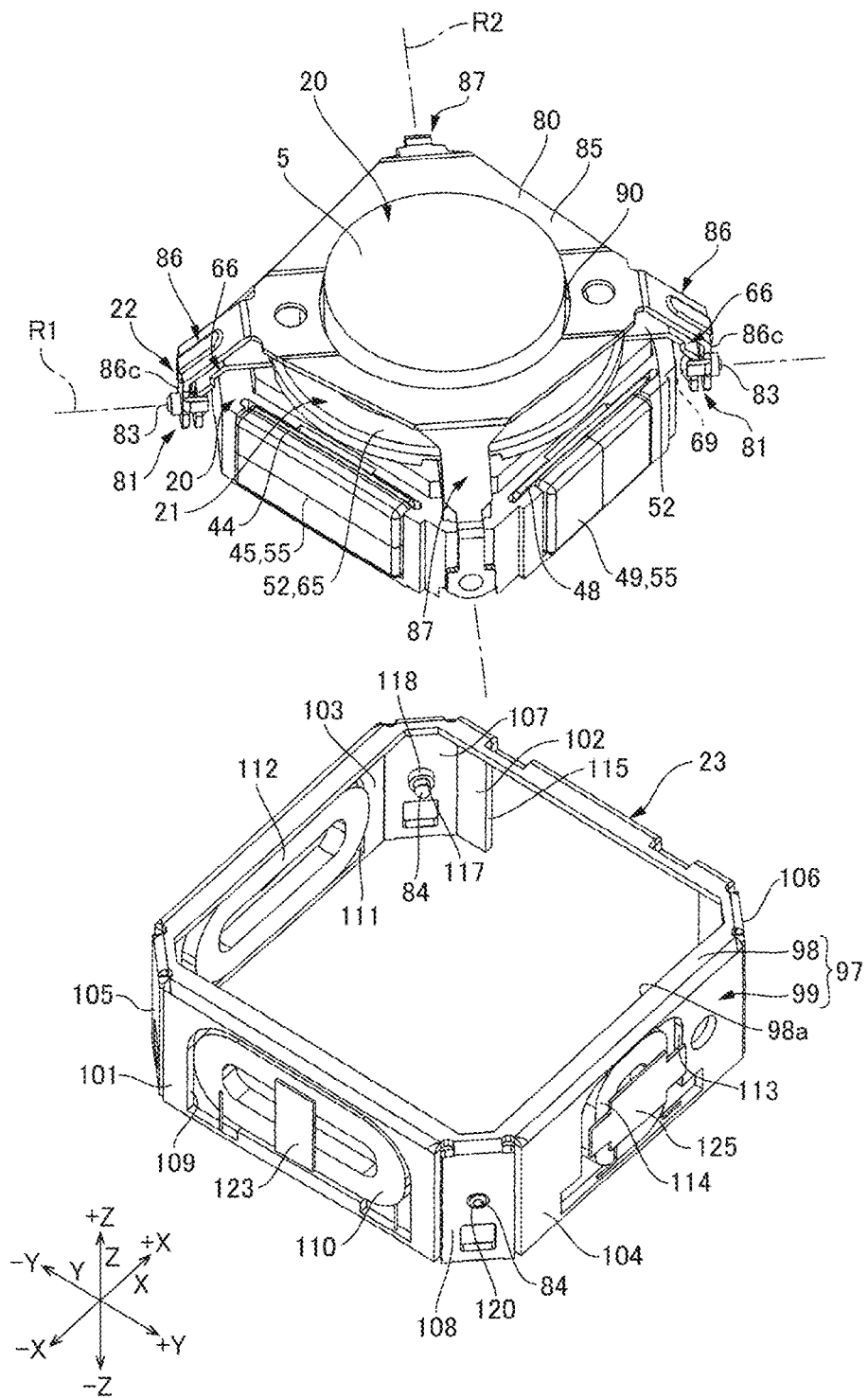
FIG. 7 is an exploded perspective view of the optical-unit main body.

FIG. 1 is a perspective view of an optical unit 1 with a shake correction function. FIG. 2 is a perspective view of the optical unit 1 with a shake correction function from which an object-side cover has been removed. FIG. 3 is a perspective view of an optical-unit main body 3. FIG. 4 is a plan view of the optical-unit main body 3 when viewed in an optical axis direction. A first flexible printed board 6, a second flexible printed board 7, and a third flexible printed board 8 extending from the optical-unit main body 3 are omitted from the illustrations in FIG. 3 and FIG. 4. FIG. 5 is a cross-sectional view taken along the line A-A in FIG. 4. FIG. 6 is a cross-sectional view taken along the line B-B in FIG. 4. FIG. 7 is an exploded perspective view of the optical-unit main body 3.

As illustrated in FIG. 1 and FIG. 2, the optical unit 1 with a shake correction function includes: a cuboid cover 2; and the optical-unit main body 3 housed in the cover 2. The optical-unit main body 3 includes an imaging module 5 including a lens 4 and an imaging element 9 (see FIG. 8). The first flexible printed board 6 and the second flexible printed board 7 extend from the cover 2 in parallel. The third flexible printed board 8 extends from the cover 2 in a direction different from the extending direction of the first flexible printed board 6 and the second flexible printed board 7.

The optical unit 1 with a shake correction function is used in, for example, mobile phones with a camera, optical devices such as dashboard cameras, or optical devices such as action cameras or wearable cameras installed in a moving body such as helmet, bicycle, or radio-controlled helicopter. With such an optical device, if the shake of the optical device occurs during imaging, the captured image is disturbed. To prevent the inclination of a captured image, the optical unit 1 with a shake correction function corrects the inclination of the imaging module 5 based on the acceleration, the angular velocity, the degree of shake, etc., detected by a detecting unit such as a gyroscope.

The optical unit 1 with a shake correction function according to this example rotates the imaging module 5 around an optical axis L of the lens 4, around a first axis R1 perpendicular to the optical axis L, and around a second axis R2 perpendicular to the optical axis L and the first axis R1 so as to correct the shake.

In the following description, the three axes perpendicular to one another are the X-axis direction, the Y-axis direction, and the Z-axis direction. One side of the X-axis direction is the −X direction and the other side thereof is the +X direction. One side of the Y-axis direction is the −Y direction, and the other side thereof is the +Y direction. One side of the Z-axis direction is the −Z direction, and the other side thereof is the +Z direction. The X-axis direction is the longitudinal direction of the cover 2. The Y-axis direction is the lateral direction of the cover 2. The first flexible printed board 6 and the second flexible printed board 7 extend from the cover 2 in the +X direction. The third flexible printed board 8 extends from the cover 2 in the −Y direction. The Z-axis direction is the optical axis direction along the optical axis L. The −Z direction is the image side of the imaging module 5, and the +Z direction is the object side of the imaging module 5. The first axis R1 and the second axis R2 are tilted around the Z-axis (around the optical axis L) by 45 degrees with respect to the X-axis and the Y-axis.

As illustrated in FIG. 2, the cover 2 includes a plate-shaped image-side cover 10 that covers the optical-unit main body 3 from the −Z direction. As illustrated in FIG. 1, the cover 2 includes an object-side cover 11 that is placed over the image-side cover 10 from the +Z direction. The object-side cover 11 includes: a first cover 12 having a frame-like shape and covering the outer circumference of the optical-unit main body 3; and a second cover 13 having a box-like shape and disposed in the +X direction of the first cover 12. The second cover 13 partially covers the first flexible printed board 6 and the second flexible printed board 7 that extend from the optical-unit main body 3 in the +X direction.

As illustrated in FIG. 2, each of the first flexible printed board 6 and the second flexible printed board 7 includes a bend portion 15 that is a portion covered with the second cover 13. The bend portion 15 includes: a first bend portion 16 that extends along the XY plane and bends in the Z-axis direction; a second bend portion 17 that bends in the X-axis direction along the YZ plane; and a third bend portion 18 that bends in the Y-axis direction along the XZ plane. The second bend portions 17 are disposed in the X-axis direction to form a winding arrangement. The end of the bend portion 15 of the flexible printed board in the +X direction is secured to the end of the image-side cover 10 in the +X direction via a reinforcing plate 19.

As illustrated in FIG. 3, FIG. 4, and FIG. 7, the optical-unit main body 3 includes: a movable body 20 including the imaging module 5; and a rotation support structure 21 rotatably supporting the movable body 20 around the optical axis L. The optical-unit main body 3 further includes: a gimbal structure 22 that supports the rotation support structure 21 rotatably the rotation support structure 21 around the first axis R1 and around the second axis R2; and a securing body 23 that supports the movable body 20 via the gimbal structure 22 and the rotation support structure 21. The movable body 20 is supported by the securing body 23 via the rotation support structure 21 and the gimbal structure 22 rotatably around the first axis R1 and the second axis R2. The movable body 20 rotates around the first axis R1 and the second axis R2 in combination to rotate around the X-axis and the Y-axis. Accordingly, the optical unit 1 with a shake correction function performs a pitching correction around the X-axis, a yawing correction around the Y-axis, and a rolling correction around the Z-axis.

The optical-unit main body 3 includes a shake-correction magnetic drive structure 25 that rotates the movable body 20 around the first axis R1 and the second axis R2. The shake-correction magnetic drive structure 25 includes: a first shake-correction magnetic drive structure 26 that generates a drive force around the X-axis for the movable body 20; and a second shake-correction magnetic drive structure 27 that generates a drive force around the Y-axis for the movable body 20. The first shake-correction magnetic drive structure 26 is disposed in the −Y direction from the imaging module 5. The second shake-correction magnetic drive structure 27 is disposed in the −X direction of the imaging module 5. The optical-unit main body 3 further includes a rolling-correction magnetic drive structure 28 that rotates the movable body 20 around the optical axis L. The rolling-correction magnetic drive structure 28 is disposed in the +Y direction from the imaging module 5.

The first shake-correction magnetic drive structure 26, the second shake-correction magnetic drive structure 27, and the rolling-correction magnetic drive structure 28 are arranged in the circumferential direction around the optical axis L. When viewed in the direction perpendicular to the optical axis L, the rolling-correction magnetic drive structure 28 is overlapped with the shake-correction magnetic drive structure 25. According to this example, the rolling-correction magnetic drive structure 28 and the first shake-correction magnetic drive structure 26 are disposed at the opposing positions with the optical axis L interposed therebetween.

As illustrated in FIG. 2, the third flexible printed board 8 extends along the outer circumference of the optical-unit main body 3. The third flexible printed board 8 extends from the outer circumference of the optical-unit main body 3 in the −Y direction.

Movable Body

Figure 8:
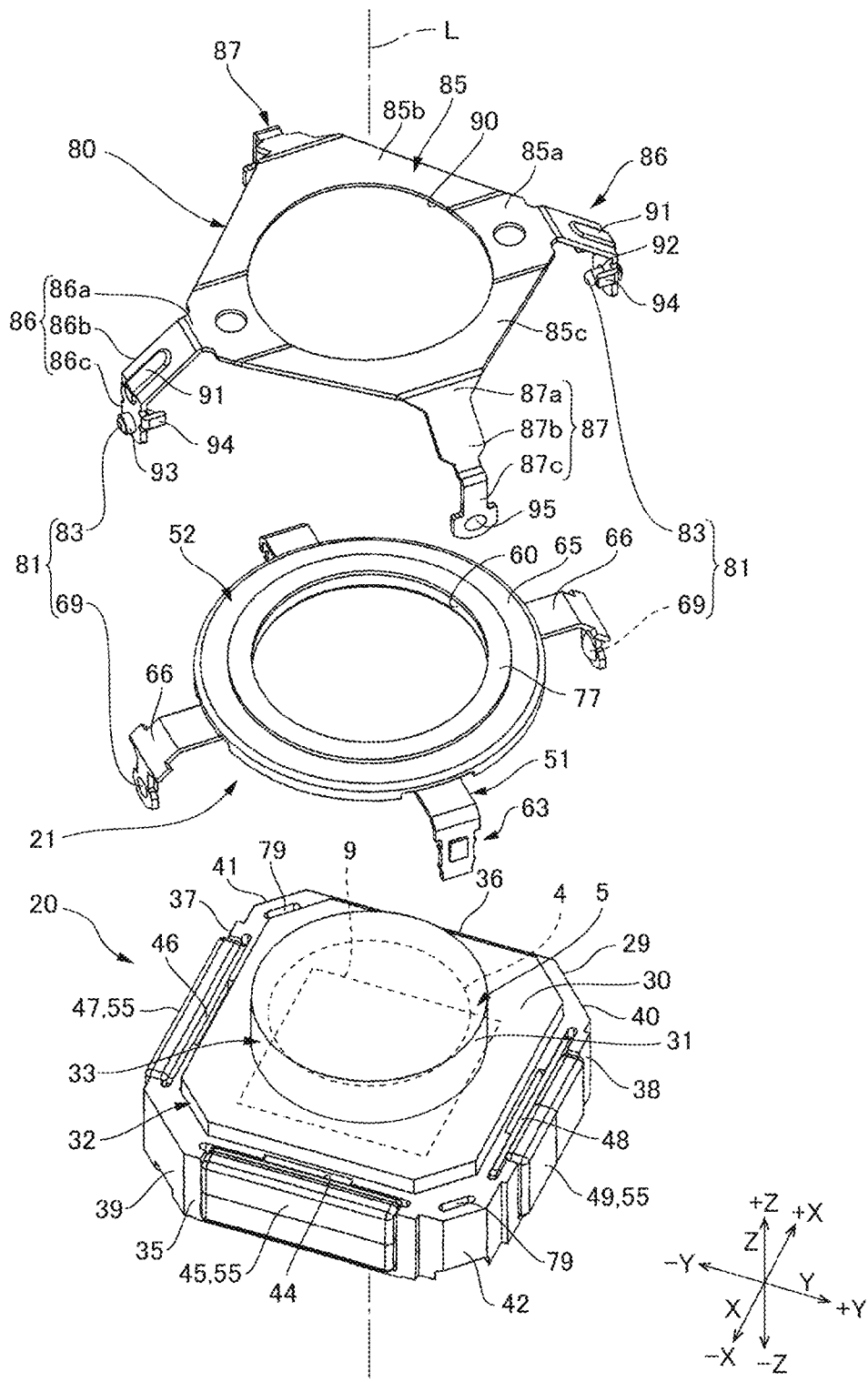
FIG. 8 is an explanatory diagram of a movable body, a rotation support structure, and a gimbal structure.

FIG. 8 is an explanatory diagram of the movable body 20, the rotation support structure 21, and the gimbal structure 22. As illustrated in FIG. 8, the movable body 20 includes: the imaging module 5; and a holder 29 having a frame-like shape and surrounding the outer circumference side of the imaging module 5. The imaging module 5 includes: an imaging-module main body 30; and a cylindrical portion 31 protruding from the center of the imaging-module main body 30 in the +Z direction. The cylindrical portion 31 houses the lens 4. The cylindrical portion 31 is coaxial with the optical axis L and extends in the direction of the optical axis L with a certain outer diameter. The imaging-module main body 30 houses the imaging element 9. The imaging element 9 is disposed in the −Z direction of the lens 4 on the optical axis L of the lens 4. The holder 29 and the imaging-module main body 30, which is located inside the holder 29 of the imaging module 5 with respect to the radial direction of the holder 29, constitute a movable-body main body 32. The cylindrical portion 31 of the imaging module 5 forms a movable-body protrusion 33 protruding from the center of the movable-body main body 32 in the +Z direction.

As illustrated in FIG. 8, the movable-body main body 32 has substantially an octagon shape when viewed from above. The movable-body main body 32 includes: a first side wall 35 and a second side wall 36 extending parallel to the Y-direction; and a third side wall 37 and a fourth side wall 38 extending parallel to the X-direction. The first side wall 35 is disposed in the −X direction from the second side wall 36. The third side wall 37 is disposed in the −Y direction from the fourth side wall 38. The movable-body main body 32 further includes a fifth side wall 39 and a sixth side wall 40 that are diagonally placed with respect to the direction of the first axis R1; and a seventh side wall 41 and an eighth side wall 42 that are diagonally placed with respect to the direction of the second axis R2. The fifth side wall 39 is disposed in the −X direction from the sixth side wall 40. The seventh side wall 41 is disposed in the −Y direction from the eighth side wall 42.

The first side wall 35 of the movable body 20 is secured to a first magnet 45 (shake-correction magnet) via a plate-shaped first yoke 44 that is made of a magnetic material. The first magnet 45 is divided into two in the Z-axis direction. The third side wall 37 of the movable body 20 is secured to a second magnet 47 (shake-correction magnet) via a plate-shaped second yoke 46 that is made of a magnetic material. The first magnet 45 and the second magnet 47 are arranged such that the same pole is assigned in the Z-axis direction. The second magnet 47 is divided into two in the Z-axis direction. The fourth side wall 38 of the movable body 20 is secured to a third magnet 49 (rolling-correction magnet) via a plate-shaped third yoke 48 that is made of a magnetic material. The third magnet 49 is divided into two in the circumferential direction.

The first magnet 45 and the second magnet 47 are shake-correction magnets for the shake-correction magnetic drive structure 25 that rotates the movable body 20 around the first axis R1 and the second axis R2. The shake-correction magnetic drive structure 25 includes, as shake-correction magnets, the first magnet 45 and the second magnet 47 disposed in the circumferential direction with the first axis R1 interposed therebetween. The third magnet 49 is a rolling-correction magnet for the rolling-correction magnetic drive structure 28 that rotates the movable body 20 around the optical axis L. The third magnet 49 is disposed on the side opposite to the second magnet 47 with the optical axis L interposed therebetween.

Rotation Support Structure

Figure 9:
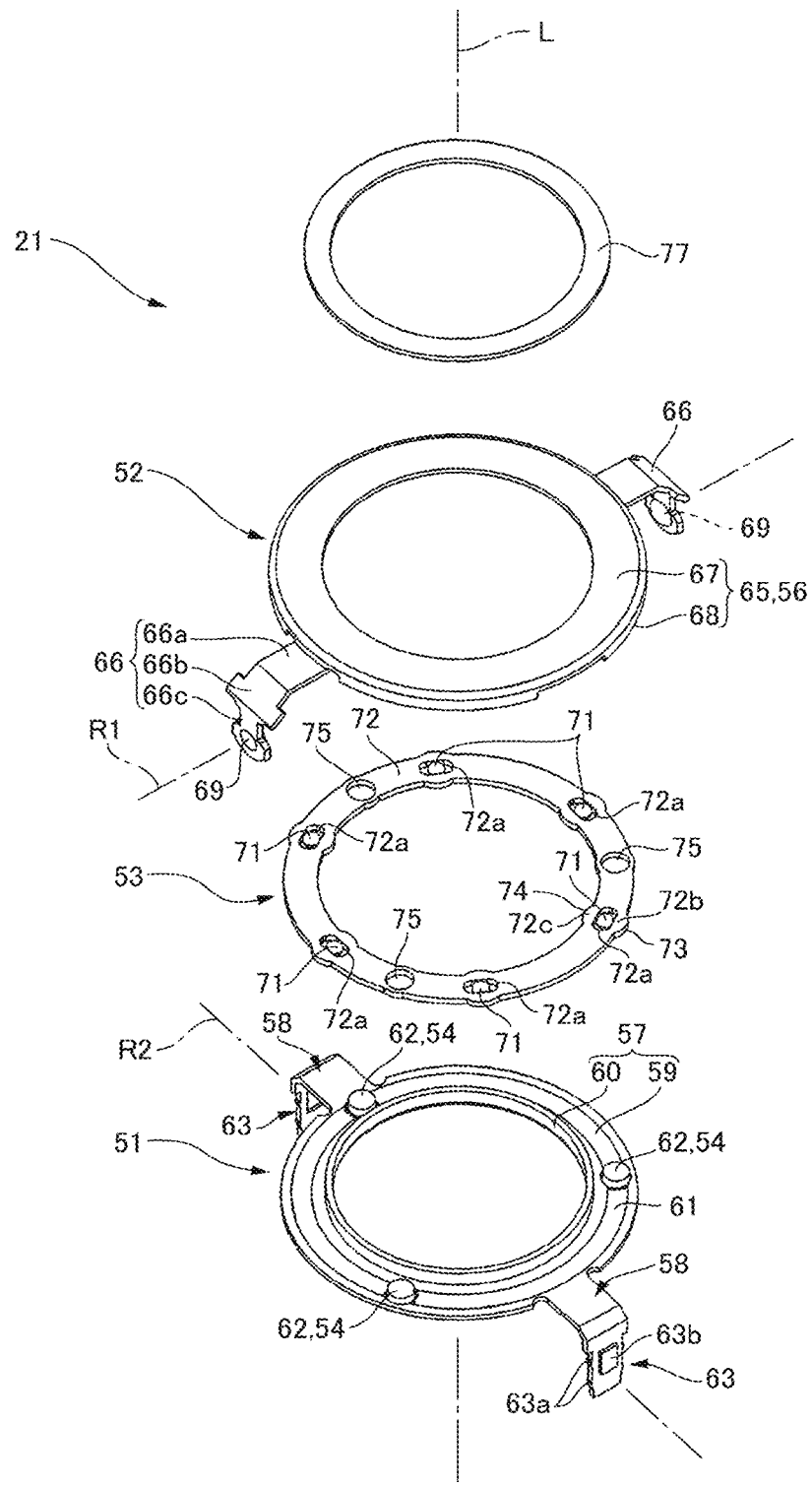
FIG. 9 is an exploded perspective view of the rotation support structure when viewed from one side in the optical axis direction.
Figure 10:
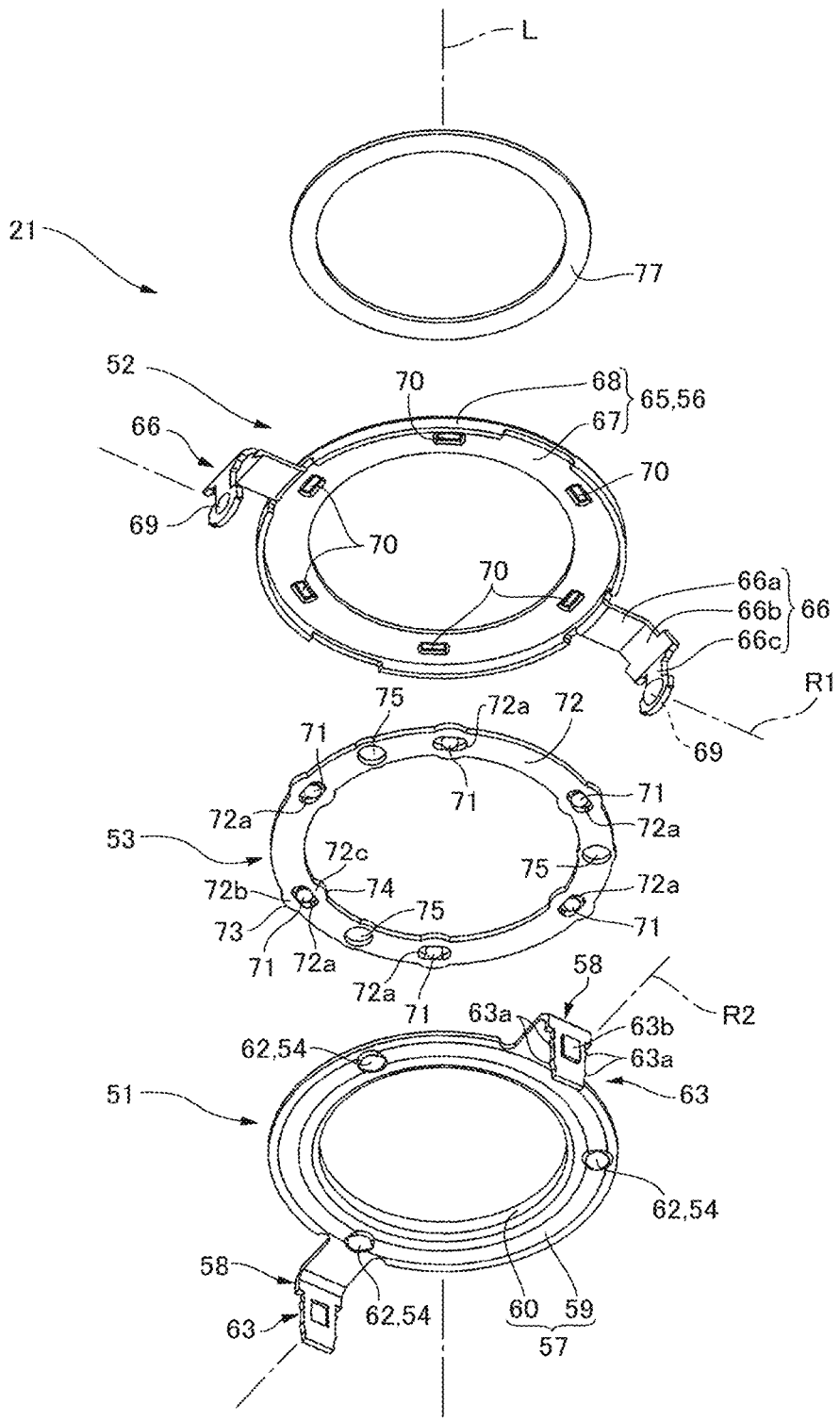
FIG. 10 is an exploded perspective view of the rotation support structure when viewed from the other side in the optical axis direction.

FIG. 9 is an exploded perspective view of the rotation support structure 21 when viewed from the +Z direction. FIG. 10 is an exploded perspective view of the rotation support structure 21 when viewed from the −Z direction. As illustrated in FIG. 9 and FIG. 10, the rotation support structure 21 includes: a plate roll 51 secured to the movable body 20; a plate holder 52 including a facing portion 56 facing the plate roll 51 in the Z-axis direction; and a rotation structure 53 allowing the rotation of the plate roll 51 and the plate holder 52 around the optical axis L. The rotation support structure 21 further includes a first pressurization structure 54 and a second pressurization structure 55 to bias the plate roll 51 in the direction so as to come close to the plate holder 52.

The plate roll 51 is made of a metal and a non-magnetic material. The plate roll 51 includes: a plate-roll annular portion 57 surrounding the optical axis L; and a pair of plate-roll extension portions 58 protruding from the plate-roll annular portion 57 to both sides in the direction of the second axis R2 and extending in the −Z direction. The plate-roll annular portion 57 includes: a plate-roll annular plate 59; and a plate-roll annular wall 60 (inner wall) bending and extending from the inner circumference edge of the plate-roll annular plate 59 in the +Z direction. The plate-roll annular wall 60 has a tubular shape. As illustrated in FIG. 9, the end surface of the plate-roll annular plate 59 with respect to the +Z direction includes a plate-roll annular groove 61 at the center in the radial direction. Pressurization magnets 62 are secured to the plate-roll annular plate 59 at three positions in the circumferential direction at an equal angular interval.

Each of the plate-roll extension portions 58 in the pair includes a secured portion 63 provided in the end portion in the −Z direction and secured to the movable body 20. The secured portion 63 includes a plurality of wedge-shaped protrusions 63a provided in both edges in the circumferential direction and having a wider width in the circumferential direction toward the +Z direction. The outer surface of the secured portion 63 with respect to the direction of the second axis R2 includes a rectangular protrusion 63b. The rectangular protrusion 63b protrudes by a larger degree in the direction of the second axis R2 toward the +Z direction.

The plate holder 52 is made of a magnetic material. The plate holder 52 includes a plate-holder annular portion 65; and a pair of plate-holder extension portions 66 protruding from the plate-holder annular portion 65 to both sides in the direction of the first axis R1 and extending in the −Z direction. The plate-holder annular portion 65 is, in the plate holder 52, a facing portion 56 facing the plate-roll annular portion 57 in the Z-axis direction.

The plate-holder annular portion 65 includes: a plate-holder annular plate 67 disposed on the side of the plate-roll annular portion 57 in the +Z direction; and a plurality of plate-holder circular arc walls 68 (outer walls) bending in the −Z direction from the outer circumference edge of the plate-holder annular plate 67. As illustrated in FIG. 10, plate-holder circular arc grooves 70 extending in the circumferential direction are provided on the end surface of the plate-holder annular plate 67 with respect to the −Z direction. According to this example, the six plate-holder circular arc grooves 70 are provided at an equal angular interval. Each of the plate-holder circular arc grooves 70 is opposed to the plate-roll annular groove 61 in the Z-axis direction.

Each of the plate-holder extension portions 66 in the pair includes: plate-holder first extension portions 66a extending from the plate-holder annular portion 65 to both sides in the direction of the first axis R1; a plate-holder second extension portion 66b extending from the outer circumference end of the plate-holder first extension portion 66a and inclining in the −Z direction and in a direction away from the plate-holder annular portion 65; and a plate-holder third extension portion 66c extending in the −Z direction from the edge of the plate-holder second extension portion 66b in the −Z direction on the outer circumference side of the movable body 20. As illustrated in FIG. 5, the plate-holder first extension portions 66a protrude in the direction of the first axis R1 from the edges of the plate-holder circular arc walls 68 in the −Z direction disposed at both sides in the direction of the first axis R1. The plate-holder third extension portion 66c in one of the plate-holder extension portions 66 is opposed to the fifth side wall 39 of the movable body 20 with a small gap in the direction of the first axis R1. The plate-holder third extension portion 66c in the other of the plate-holder extension portions 66 is opposed to the sixth side wall 40 of the movable body 20 with a small gap in the direction of the first axis R1. Each of the plate-holder third extension portions 66c includes a first-axis side recessed curved face 69 that is recessed inward (toward the movable body 20) in the radial direction on the line of the first axis R1.

As illustrated in FIG. 9 and FIG. 10, the rotation structure 53 includes a plurality of spherical objects 71 and a retainer 72. The spherical object 71 is made of a metal. The retainer 72 is made of a resin. The retainer 72 includes a plurality of spherical-object holding holes 72a that hold the respective spherical objects 71 in a rollable manner. According to this example, the rotation structure 53 includes the six spherical objects 71. Accordingly, the retainer 72 includes the six spherical-object holding holes 72a. The spherical object 71 is held by the spherical-object holding hole 72a to protrude from the retainer 72 in the −Z direction and in the +Z direction. According to this example, each of the spherical-object holding holes 72a is an elongated hole that is longer in the circumferential direction than in the radial direction. When the spherical object 71 is located at the center of the spherical-object holding hole 72a, there is a gap between the spherical object 71 and an outer retainer portion 72b of the retainer 72 on the outer circumference side of the spherical-object holding hole 72a and between the spherical object 71 and an inner retainer portion 72c of the retainer 72 on the inner circumference side of the spherical-object holding hole 72a.

The retainer 72 includes: an outer protrusion 73 protruding to the outer circumference side from the outer retainer portion 72b, which is located outside of each of the spherical-object holding holes 72a in the radial direction; and an inner protrusion 74 protruding to the inner circumference side from the inner retainer portion 72c, which is located inside of each of the spherical-object holding holes 72a in the radial direction. The retainer 72 includes retainer through-holes 75 penetrating in the Z-axis direction at three positions in the circumferential direction.

As illustrated in FIG. 8, the plate-roll annular wall 60 is inserted into the inside of the plate-holder annular portion 65 in the −Z direction so that the plate roll 51 and the plate holder 52 are overlapped with each other in the Z-axis direction. The end portion in the +Z direction of the plate-roll annular wall 60 protrudes in the +Z direction as compared with the plate-holder annular portion 65. When the plate roll 51 and the plate holder 52 are overlapped with each other, the spherical objects 71 and the retainer 72 are disposed between the plate-holder annular portion 65 and the plate-roll annular portion 57.

When the retainer 72 is disposed between the plate-holder annular portion 65 and the plate-roll annular portion 57, the plate-holder circular arc wall 68 is in contact with the outer protrusion 73 from outside in the radial direction, as illustrated in FIG. 5. Further, the plate-roll annular wall 60 is in contact with the inner protrusion 74 from inside in the radial direction. Thus, the retainer 72 is positioned between the plate-holder annular portion 65 and the plate-roll annular portion 57 in the radial direction. The end portions of the spherical objects 71 in the −Z direction, housed in the respective spherical-object holding holes 72a of the retainer 72, are inserted into the plate-roll annular grooves 61, and the end portions thereof in the +Z direction are inserted into the plate-holder circular arc grooves 70. When the retainer 72 is disposed between the plate-holder annular portion 65 and the plate-roll annular portion 57, the pressurization magnet 62 is inserted into the retainer through-hole 75.

As illustrated in FIG. 5 and FIG. 8, edge in the +Z direction of the plate-roll annular wall 60 is secured to an annular plate member 77. When viewed from the direction of the optical axis L, the outer circumference portion of the plate member 77 is overlapped with the inner circumference edge portion of the plate-holder annular portion 65. A small gap is formed in the Z-axis direction between the plate member 77 and the plate-holder annular portion 65. Here, the pressurization magnet 62, secured to the plate-roll annular portion 57 and inserted into the retainer through-hole 75, attracts the plate roll 51, which is made of a non-magnetic material, in the direction so as to come close to the plate holder 52. That is, the pressurization magnets 62 constitute the first pressurization structure 54 that biases the plate roll 51 in the direction so as to come close to the plate holder 52.

As illustrated in FIG. 6 and FIG. 8, the movable body 20 includes plate-roll securing holes 79 at the two edge portions of the movable-body main body 32 with respect to the direction of the second axis R2 to receive the secured portions 63 of the plate-roll extension portions 58 in the pair. The plate-roll securing hole 79 is provided in the holder 29. The plate-roll securing holes 79 extend in the −Z direction in parallel to the seventh side wall 41 and the eighth side wall 42.

The secured portion 63 of each of the plate-roll extension portions 58 of the plate roll 51 is pressed into the plate-roll securing hole 79 so that the rotation support structure 21 is secured to the movable body 20. When the secured portion 63 is inserted into the plate-roll securing hole 79, the movable-body protrusion 33 is inserted into the plate-roll annular wall 60. Accordingly, the movable-body protrusion 33 (the cylindrical portion 31) is fitted into the plate-roll annular wall 60 so that the plate roll 51 is secured to the movable body 20 in a state where the plate-roll annular wall 60 is positioned so as to be coaxial with the optical axis L. When the secured portion 63 of each of the plate-roll extension portions 58 is pressed into the plate-roll securing hole 79, the protrusion 63a and the protrusion 63b of the secured portion 63 are plastically deformed and crushed. Thus, the plate roll 51 and the movable body 20 are secured to each other. When the plate roll 51 and the movable body 20 are secured to each other, the movable body 20 is rotatable around the optical axis L together with the plate roll 51.

When the plate roll 51 of the rotation support structure 21 and the movable body 20 are secured to each other, the plate holder 52, which is made of a magnetic material, is located on the side opposite to the first magnet 45, the second magnet 47, and the third magnet 49 with respect to the plate roll 51. In other words, the plate-holder annular portion 65 is located on the side opposite to the first magnet 45, the second magnet 47, and the third magnet 49 with the plate-roll annular portion 57 interposed therebetween in the Z-axis direction. Accordingly, the first magnet 45, the second magnet 47, and the third magnet 49 attract the plate-holder annular portion 65 in the direction so as to come close to the plate-roll annular portion 57. Thus, the first magnet 45, the second magnet 47, and the third magnet 49 constitute the second pressurization structure 55 that biases the plate roll 51 in the direction so as to come close to the plate holder 52. According to this example, the movable body 20 and the plate roll 51 are attracted toward the plate-holder annular portion 65 in the +Z direction due to the attractive forces of the first magnet 45, the second magnet 47, and the third magnet 49 attracting the plate-holder annular portion 65 in the direction to come close to the plate-roll annular portion 57.

Gimbal Structure

Figure 11:
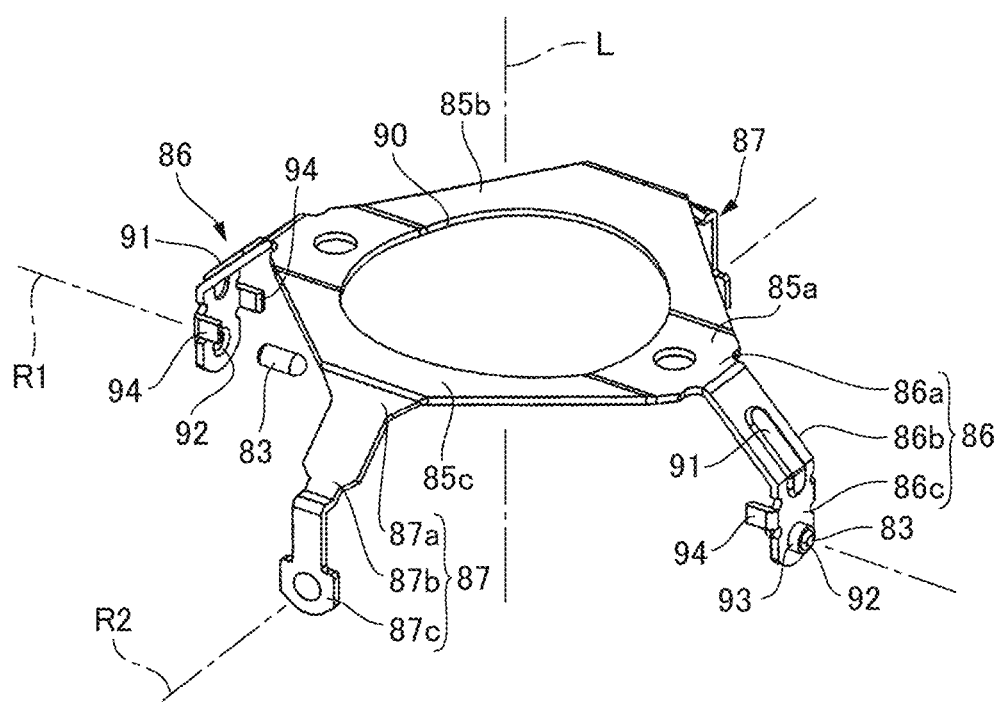
FIG. 11 is an exploded perspective view of a gimbal frame and a first-axis side shaft.

FIG. 11 is an exploded perspective view of a gimbal frame 80 and a first-axis side shaft 83. As illustrated in FIG. 4, the gimbal structure 22 includes: the gimbal frame 80; and a first coupling structure 81 coupling the gimbal frame 80 and the plate holder 52 rotatably around the first axis R1. The gimbal structure 22 further includes a second coupling structure 82 coupling the gimbal frame 80 and the securing body 23 rotatably around the second axis R2. As illustrated in FIG. 5 and FIG. 7, the first coupling structure 81 includes: the first-axis side shaft 83 protruding along the first axis R1 toward the plate holder 52 from the gimbal frame 80; and the first-axis side recessed curved face 69 provided in the plate holder 52 and rotatably contacting with the end of the first-axis side shaft 83. As illustrated in FIG. 6 and FIG. 7, the second coupling structure 82 includes: a second-axis side shaft 84 protruding along the second axis R2 toward the gimbal frame 80 from the securing body 23; and a second-axis side recessed curved face 95 provided in the gimbal frame 80 and contacting with the end of the second-axis side shaft 84.

Gimbal Frame

The gimbal frame 80 is a metallic plate spring. As illustrated in FIG. 8, the gimbal frame 80 includes: a gimbal-frame main body 85 disposed in the +Z direction from the plate holder 52; a pair of first-axis side gimbal frame extension portions 86 protruding from the gimbal-frame main body 85 to both sides in the direction of the first axis R1 and extending in the −Z direction; and a pair of second-axis side gimbal frame extension portions 87 protruding from the gimbal-frame main body 85 to both sides in the direction of the second axis R2 and extending in the −Z direction. The gimbal-frame main body 85 includes: a center plate portion 85a having substantially a rectangular shape and extending in the direction of the first axis R1; a first inclined plate portion 85b extending from one side (the side in the −Y direction) of the center plate portion 85a with respect to the direction of the second axis R2 toward the outer circumference side and inclining in the +Z direction; and a second inclined plate portion 85c extending from the other side (the side in the +Y direction) of the center plate portion 85a with respect to the direction of the second axis R2 toward the outer circumference side and inclining in the +Z direction. The gimbal-frame main body 85 includes an opening 90 provided at the center and penetrating in the Z-axis direction. The movable-body protrusion 33 is inserted into the opening 90.

As illustrated in FIG. 5, FIG. 7, and FIG. 8, the pair of first-axis side gimbal frame extension portions 86 is located on the outer circumference side of the plate holder 52. As illustrated in FIG. 8, each of the first-axis side gimbal frame extension portions 86 in the pair includes: a first-axis side gimbal frame extension portion first extension portion 86a extending in a direction away from the gimbal-frame main body 85 along the direction of the first axis R1; a first-axis side gimbal frame extension portion second extension portion 86b (inclined extension portion) extending from the end of the first-axis side gimbal frame extension portion first extension portion 86a in a direction away from the gimbal-frame main body 85 along the direction of the first axis R1 and inclining in the −Z direction; and a first-axis side gimbal frame extension portion third extension portion 86c (coupling extension portion) extending in the −Z direction from the end of the first-axis side gimbal frame extension portion second extension portion 86b in the −Z direction on the outer circumference side of the plate holder 52.

As illustrated in FIG. 5 and FIG. 8, the first-axis side gimbal frame extension portion first extension portion 86a protrudes from the center plate portion 85a in the direction of the first axis R1. The first-axis side gimbal frame extension portion third extension portion 86c includes a gimbal-frame extension portion through-hole 92 penetrating in the direction of the first axis R1. The first-axis side gimbal frame extension portion third extension portion 86c includes a first-axis side shaft support cylindrical portion 93 protruding from the hole edge of the gimbal-frame extension portion through-hole 92 to the outer circumference side in the direction of the first axis R1. The first-axis side gimbal frame extension portion third extension portion 86c includes a pair of gimbal-frame extension portion protrusions 94 protruding to the inner circumference side from both edges in the circumferential direction. In the first-axis side gimbal frame extension portion third extension portion 86c, the pair of gimbal-frame extension portion protrusions 94 is located on the side in the +Z direction of the gimbal-frame extension portion through-hole 92. A rib 91 is provided on the outer surface of the first-axis side gimbal frame extension portion 86 on the side opposite to the plate-holder extension portion 66 and extending from the first-axis side gimbal frame extension portion second extension portion 86b to the first-axis side gimbal frame extension portion third extension portion 86c. The rib 91 extends through a bend portion between the first-axis side gimbal frame extension portion second extension portion 86b and the first-axis side gimbal frame extension portion third extension portion 86c.

The first-axis side shaft 83 has a cylindrical shape and is inserted into the gimbal-frame extension portion through-hole 92 and the first-axis side shaft support cylindrical portion 93 to be held by the gimbal frame 80. Thus, the first-axis side shaft 83 extends on the first axis R1 in the direction of the first axis R1. The end of the first-axis side shaft 83 on the inner circumference side protrudes from the first-axis side gimbal frame extension portion third extension portion 86c toward the plate-holder extension portion 66. The end of the first-axis side shaft 83 on the inner circumference side has a hemispherical surface.

Next, as illustrated in FIG. 8, each of the second-axis side gimbal frame extension portions 87 in the pair includes: a second-axis side gimbal frame extension portion first extension portion 87a extending in a direction away from the gimbal-frame main body 85 along the direction of the second axis R2; a second-axis side gimbal frame extension portion second extension portion 87b extending from the end of the second-axis side gimbal frame extension portion first extension portion 87a in a direction away from the gimbal-frame main body 85 along the direction of the second axis R2 and inclining in the −Z direction; and a second-axis side gimbal frame extension portion third extension portion 87c extending from the end of the second-axis side gimbal frame extension portion second extension portion 87 in the −Z direction b in the −Z direction on the outer circumference side of the movable body 20. The second-axis side gimbal frame extension portion first extension portion 87a in one of the second-axis side gimbal frame extension portions 87 in the −Y direction protrudes from the edge of the first inclined plate portion 85b on the outer circumference side in the direction of the second axis R2. The second-axis side gimbal frame extension portion first extension portion 87a in one of the second-axis side gimbal frame extension portions 87 in the +Y direction protrudes from the edge of the second inclined plate portion 85c on the outer circumference side in the direction of the second axis R2. Each of the second-axis side gimbal frame extension portion third extension portions 87c includes a second-axis side recessed curved face 95 that is recessed toward the inner circumference side on the second axis R2.

First Coupling Structure

As illustrated in FIG. 7, the pair of plate-holder extension portions 66 is disposed between the pair of first-axis side gimbal frame extension portions 86 and the movable body 20. The first-axis side gimbal frame extension portion third extension portion 86c holding the first-axis side shaft 83 is opposed to the plate-holder third extension portion 66c including the first-axis side recessed curved face 69 on the first axis R1. The first coupling structure 81 is configured such that the end of the first-axis side shaft 83 protruding through the first-axis side gimbal frame extension portion 86 toward the inner circumference side is in contact with the first-axis side recessed curved face 69. According to this example, the first-axis side shaft 83 and the first-axis side recessed curved face 69 are in the point contact with each other. Accordingly, the rotation support structure 21 is supported by the gimbal frame 80 via the first coupling structure 81 rotatably around the first axis R1. Therefore, the movable body 20 supported by the rotation support structure 21 is supported by the gimbal structure 22 rotatably around the first axis R1. In a state where the first-axis side shaft 83 is in contact with the first-axis side recessed curved face 69, the plate-holder extension portions 66 are located on the inner side of the pair of gimbal-frame extension portion protrusions 94 provided on the first-axis side gimbal frame extension portions 86.

When the movable body 20 and the rotation support structure 21 are supported by the gimbal structure 22, the gimbal-frame main body 85, the plate-roll annular portion 57, and the plate-holder annular portion 65 are disposed on the side of the movable-body main body 32 in the +Z direction and on the outer circumference side of the movable-body protrusion 33. The plate-roll annular portion 57 is disposed between the gimbal-frame main body 85 and the movable-body main body 32 in the Z-axis direction. The plate-holder annular portion 65 is disposed on the side of the plate-roll annular portion 57 in the +Z direction and between the gimbal-frame main body 85 and the movable-body main body 32 in the Z-axis direction. The plate-roll annular portion 57 and the plate-holder annular portion 65 are disposed on the +Z direction from the first axis R1 and the second axis R2. The gimbal-frame main body 85, the plate-roll annular portion 57, and the plate-holder annular portion 65 are disposed on the side of the imaging element 9 in the +Z direction.

Securing Body

Figure 12:
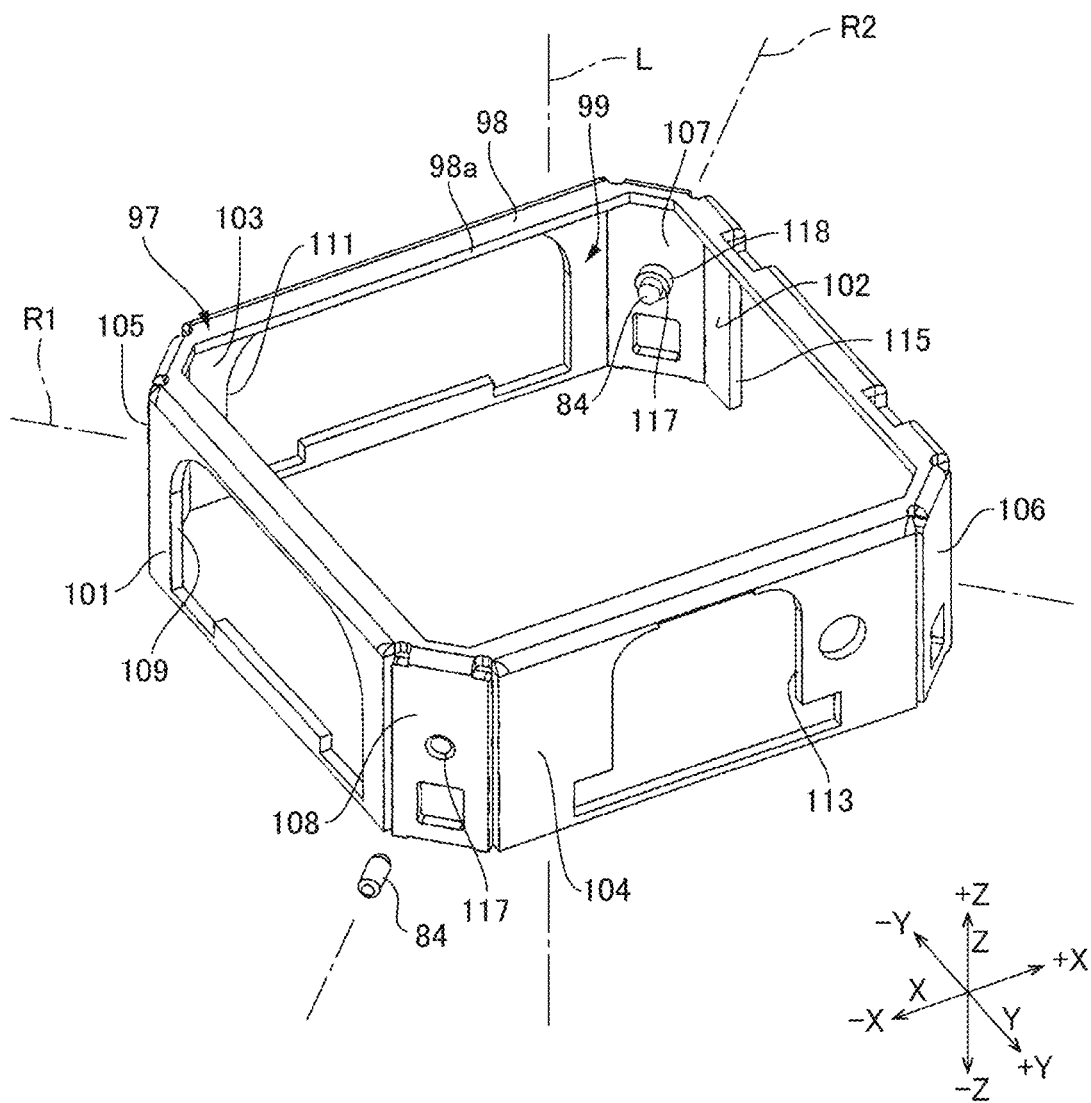
FIG. 12 is an exploded perspective view of a chassis and a second-axis side shaft.

FIG. 12 is an exploded perspective view of a chassis 97 and the second-axis side shaft 84. As illustrated in FIG. 7, the securing body 23 includes the frame-shaped chassis 97 (frame) surrounding the outer circumference side of the movable body 20 and the rotation support structure 21. The chassis 97 is made of a metal and a non-magnetic material. The chassis 97 has an octagon shape when viewed in the Z-axis direction. As illustrated in FIG. 12, the chassis 97 includes an octagonal frame-shaped plate portion 98 and a frame portion 99 disposed on the outer side of the movable-body main body 32 with respect to the radial direction. The frame portion 99 bends from the outer peripheral edge of the frame-shaped plate portion 98 and extends in the −Z direction.

The frame-shaped plate portion 98 has a constant thickness in the Z-axis direction. The frame portion 99 has a constant thickness in the direction perpendicular to the optical axis L. The frame-shaped plate portion 98 and the frame portion 99 have the same thickness. That is, the chassis 97 is formed by punching a plate with the development form that is the planar development of the chassis 97 to form a chassis substrate, bending the chassis substrate to form a three-dimensional shape, and then welding required areas. A rectangular opening 98a is provided at the center of the frame-shaped plate portion 98. When viewed in the Z-axis direction, the holder 29 of the movable body 20 is disposed on the inner circumference side of the opening 98a.

The frame portion 99 includes a first side plate 101 and a second side plate 102 extending parallel to the Y-direction and a third side plate 103 and a fourth side plate 104 extending parallel to the X-direction. The first side plate 101 is located in the −X direction from the second side plate 102. The third side plate 103 is located on the −Y direction of the fourth side plate 104. The frame portion 99 further includes, at the opposing corners with respect to the direction of the first axis R1, a fifth side plate 105 coupling the first side plate 101 and the third side plate 103 and a sixth side plate 106 coupling the second side plate 102 and the fourth side plate 104. The fifth side plate 105 and the sixth side plate 106 extend in parallel. The frame portion 99 further includes, at the opposing corners with respect to the direction of the second axis R2, an eighth side plate 108 coupling the first side plate 101 and the fourth side plate 104 and a seventh side plate 107 coupling the second side plate 102 and the third side plate 103. The seventh side plate 107 and the eighth side plate 108 extend in parallel.

As illustrated in FIG. 7 and FIG. 12, the first side plate 101 of the frame portion 99 includes a first coil holding opening 109. A first coil 110 (shake-correction coil) is inserted into the first coil holding opening 109. The first coil 110 has an elliptical shape that is elongated in the circumferential direction, and its center hole is oriented in the radial direction. The third side plate 103 of the frame portion 99 includes a second coil holding opening 111. A second coil 112 (shake-correction coil) is inserted into the second coil holding opening 111. The second coil 112 has an elliptical shape that is elongated in the circumferential direction, and its center hole is oriented in the radial direction. Furthermore, the fourth side plate 104 of the frame portion 99 includes a third coil holding opening 113. A third coil 114 (rolling-correction coil) is inserted into the third coil holding opening 113. The third coil 114 has an elliptical shape that is elongated in the Z-axis direction, and its center hole is oriented in the radial direction. As illustrated in FIG. 2, the third flexible printed board 8 extends along the outer circumference surfaces of the fourth side plate 104, the first side plate 101, and the third side plate 103. The first coil 110, the second coil 112, and the third coil 114 are electrically connected to the third flexible printed board 8.

The second side plate 102 includes a rectangular cutout portion 115 extending in the +Z direction from the end in the −Z direction. The first flexible printed board 6 and the second flexible printed board 7 coupled to the imaging module 5 extend from the optical-unit main body 3 in the +X direction via the cutout portion 115.

As illustrated in FIG. 12, the seventh side plate 107 and the eighth side plate 108 of the chassis 97 each include a through-hole 117 penetrating in the direction of the second axis R2. The seventh side plate 107 and the eighth side plate 108 each include a tubular portion 118 provided at the hole edge of the through-hole 117 on the inner side (the surface on the side where the second-axis side gimbal frame extension portions 87 is disposed) and protruding in the direction of the second axis R2. The second-axis side shafts 84 are inserted into the respective through-holes 117 of the seventh side plate 107 and the eighth side plate 108. The second-axis side shaft 84 has a cylindrical shape and is inserted into the through-hole 117 to be supported by the tubular portion 118.

The second-axis side shafts 84 are made of a metal and are secured to the seventh side plate 107 and the eighth side plate 108, respectively, by welding. Therefore, a welding mark 120 is provided at the contact area between the second-axis side shaft 84 and the seventh side plate 107 so as to secure the second-axis side shaft 84 to the seventh side plate 107, and the welding mark 120 is provided at the contact area between the second-axis side shaft 84 and the eighth side plate 108 so as to secure the second-axis side shaft 84 to the eighth side plate 108. As illustrated in FIG. 6 and FIG. 7, the welding marks 120 are formed at the hole edge of the through-hole 117 on the outer surface of the seventh side plate 107 and at the hole edge of the through-hole 117 on the outer surface of the eighth side plate 108. The second-axis side shafts 84 secured to the seventh side plate 107 and the eighth side plate 108 extend on the second axis R2 in the direction of the second axis R2. The inner circumference end of the second-axis side shaft 84 protrudes from the frame portion 99 toward the inner circumference side. The inner circumference end of the first-axis side shaft 83 has a hemispherical surface.

Second Coupling Structure

As illustrated in FIG. 6, the second coupling structure 82 is formed such that the gimbal frame 80 is disposed inside the chassis 97 and the end portion of the second-axis side shaft 84 is inserted into and is in contact with the second-axis side recessed curved face 95 of the second-axis side gimbal frame extension portion third extension portion 87c. The securing body 23 and the gimbal frame 80 are coupled with the second coupling structure 82 so that the gimbal frame 80, the rotation support structure 21, and the movable body 20 are supported by the securing body 23 rotatably around the second axis R2.

As the gimbal frame 80 is a plate spring, the second-axis side gimbal frame extension portion 87 is elastically deformable in the direction of the second axis R2. Therefore, when the second-axis side shaft 84 is in contact with the second-axis side recessed curved face 95 of the second-axis side gimbal frame extension portion 87, the second-axis side gimbal frame extension portion 87 is bent to the inner circumference side. Accordingly, the second-axis side gimbal frame extension portion 87 is in the elastic contact with the inner circumference side of the second-axis side shaft 84 due to the elastic restoring force toward the outer circumference side. Thus, it is possible to prevent or suppress the disconnection between the second-axis side gimbal frame extension portions 87 and the frame portion 99.

Shake-correction Magnetic Drive Structure and Rolling-Correction Magnetic Drive Structure When the movable body 20 supported by the gimbal structure 22 is disposed on the inner circumference side of the chassis 97, the first side wall 35 of the holder 29 is opposed to the first side plate 101 of the frame portion 99 with a gap in the X-axis direction. The second side wall 36 of the holder 29 is opposed to the second side plate 102 with a gap in the X-axis direction. The third side wall 37 of the holder 29 is opposed to the third side plate 103 with a gap in the Y-axis direction. The fourth side wall 38 of the holder 29 is opposed to the fourth side plate 104 with a gap in the Y-axis direction. The fifth side wall 39 of the holder 29 is opposed to the fifth side plate 105 with a gap in the direction of the first axis R1. The sixth side wall 40 of the holder 29 is opposed to the sixth side plate 106 with a gap in the direction of the first axis R1. The seventh side wall 41 of the holder 29 is opposed to the seventh side plate 107 with a gap in the direction of the second axis R2. The eighth side wall 42 of the holder 29 is opposed to the eighth side plate 108 with a gap in the direction of the second axis R2.

Thus, as illustrated in FIG. 3, the first magnet 45 secured to the first side wall 35 of the movable body 20 is opposed to the first coil 110 held by the chassis 97 with a gap in the X-direction. The first magnet 45 and the first coil 110 constitute the second shake-correction magnetic drive structure 27. Therefore, the power supply to the first coil 110 causes the movable body 20 to rotate around the Y-axis. The second magnet 47 secured to the third side wall 37 of the movable body 20 is opposed to the second coil 112 with a gap in the Y-direction. The second magnet 47 and the second coil 112 constitute the first shake-correction magnetic drive structure 26. Therefore, the power supply to the second coil 112 causes the movable body 20 to rotate around the X-axis. The shake-correction magnetic drive structure 25 combines the rotation of the movable body 20 around the Y-axis by the first shake-correction magnetic drive structure 26 and the rotation of the movable body 20 around the X-axis by the second shake-correction magnetic drive structure 27 so as to cause the movable body 20 to rotate around the first axis R1 and the second axis R2.

When the movable body 20 is disposed on the inner circumference side of the chassis 97, the third magnet 49 secured to the fourth side wall 38 of the movable body 20 is opposed to the third coil 114 with a gap in the Y-direction. The third magnet 49 and the third coil 114 constitute the rolling-correction magnetic drive structure 28. Therefore, the power supply to the third coil 114 causes the movable body 20 to rotate around the optical axis L.

As illustrated in FIG. 3 and FIG. 4, a first magnetic plate 123 is disposed on the first coil 110 on the side opposite to the movable body 20. Specifically, the first magnetic plate 123 is disposed on the first coil 110 on the side opposite to the movable body 20 with respect to the radial direction of the optical axis L. The first magnetic plate 123 is a rectangle that is elongated in the Z-axis direction and is disposed at the position overlapped with the center of the first coil 110 with respect to the Z-axis direction when viewed in the radial direction. The first magnetic plate 123 is opposed to the first magnet 45 of the movable body 20 via the first coil 110 and forms a magnetic spring that returns the movable body 20 to the reference rotation position in the rotation direction around the Y-axis. As illustrated in FIG. 3 and FIG. 7, a second magnetic plate 125 is disposed on the side opposite to the movable body 20 with respect to the third coil 114. Specifically, the second magnetic plate 125 is disposed on the side opposite to the movable body 20 with respect to the third coil 114 in the radial direction of the optical axis L. The second magnetic plate 125 is elongated in the circumferential direction. The second magnetic plate 125 is opposed to the third magnet 49 of the movable body 20 via the third coil 114 and forms a magnetic spring that returns the movable body 20 to the reference rotation position in the rotation direction around the optical axis L.

Cover Structure

Figure 13:
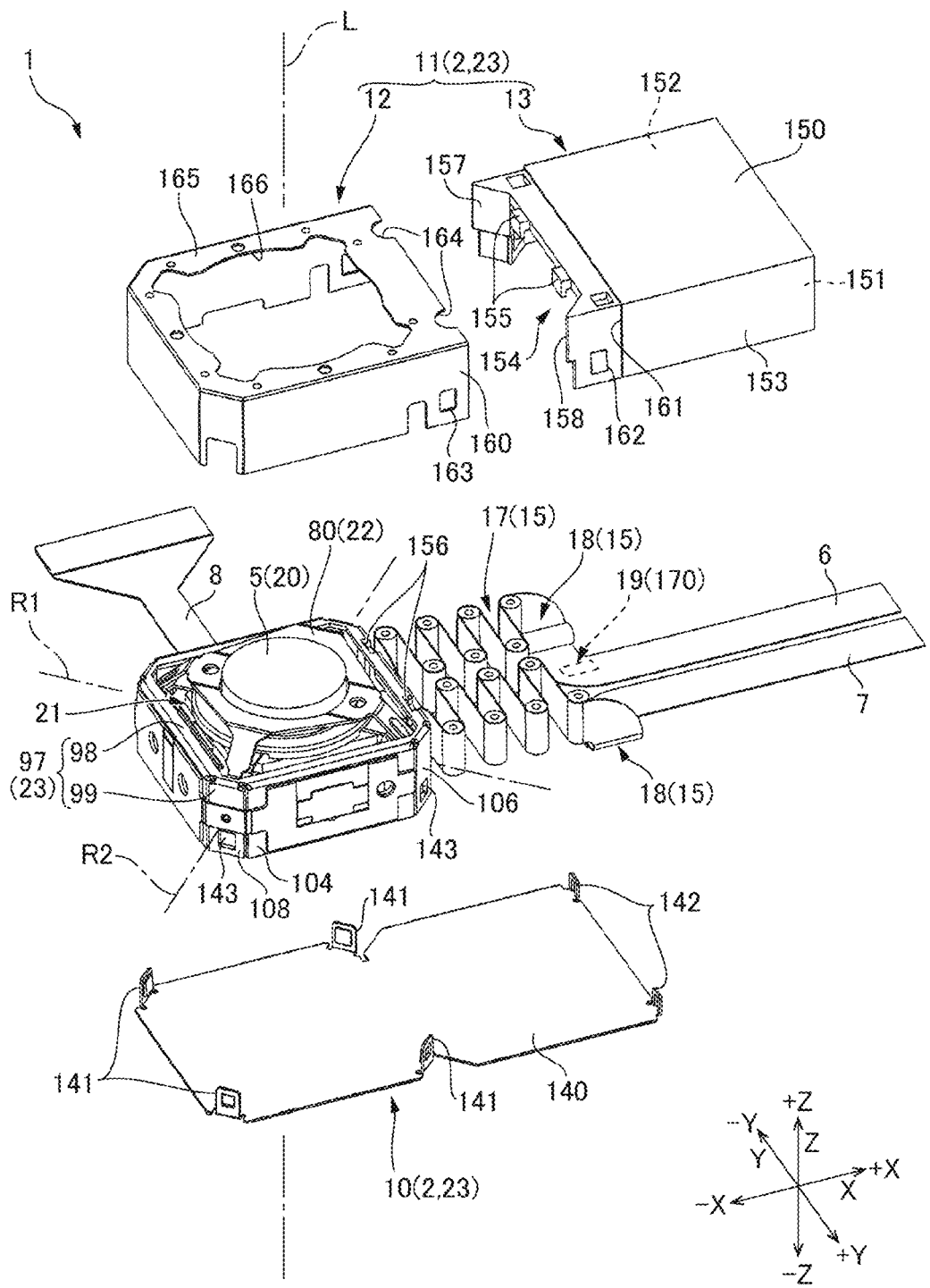
FIG. 13 is an exploded perspective view of the optical unit with a shake correction function when viewed from one side in the direction of the optical axis.
Figure 14:
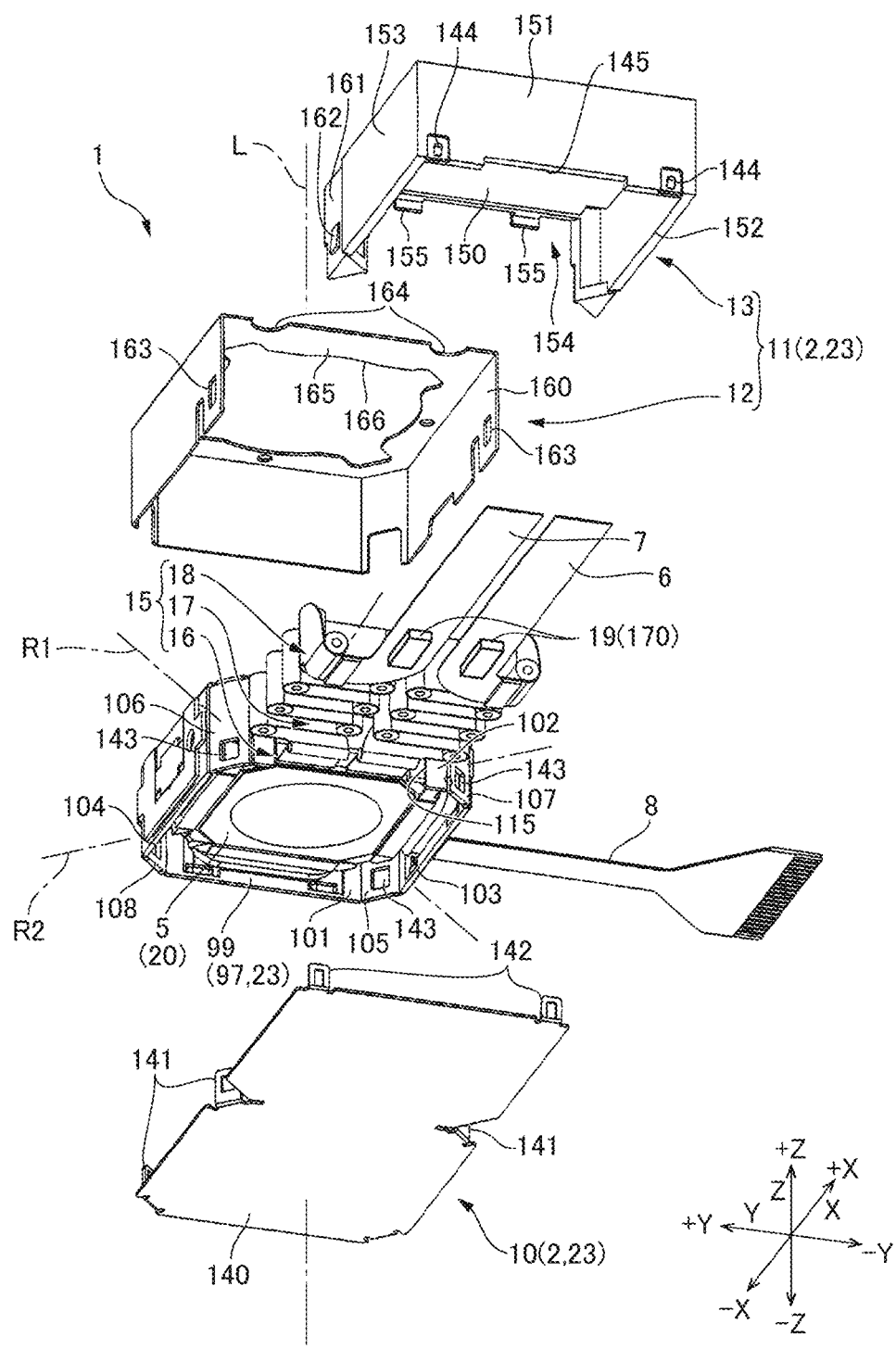
FIG. 14 is an exploded perspective view of the optical unit with a shake correction function when viewed from the other side in the direction of the optical axis.

FIG. 13 is an exploded perspective view of the optical unit 1 with a shake correction function when viewed from one side (object side) in the direction of the optical axis L. FIG. 14 is an exploded perspective view of the optical unit 1 with a shake correction function when viewed from the other side (image side) in the direction of the optical axis L. As illustrated in FIG. 13 and FIG. 14, the securing body 23 includes the rectangular frame-shaped chassis 97 surrounding the outer circumference side of the movable body 20, the rotation support structure 21, and the gimbal frame 80. The first flexible printed board 6 and the second flexible printed board 7 extending from the movable body 20 in a first direction (+X direction according to this example) are disposed in the +X direction from the chassis 97. The first flexible printed board 6 and the second flexible printed board 7 extend through the cutout portion 115 provided on the second side plate 102 of the chassis 97 and folded like an accordion.

The securing body 23 includes a cover 2 that houses the chassis 97 and houses the first flexible printed board 6 and the second flexible printed board 7 extending like an accordion to the side of the chassis 97 in the first direction (+X direction). The cover 2 includes an image-side cover 10 covering the chassis 97, the first flexible printed board 6, and the second flexible printed board 7 on the image side (−Z direction) with respect to the direction of the optical axis L; and an object-side cover 11 covering the chassis 97, the first flexible printed board 6, and the second flexible printed board 7 on the object side (+Z direction) with respect to the direction of the optical axis L. The object-side cover 11 includes two members, i.e., the first cover 12 and the second cover 13 disposed in the +X direction from the first cover 12. The second cover 13 is made of a resin, and the image-side cover 10 and the first cover 12 are made of a metal and a non-magnetic material.

The image-side cover 10 includes: an image-side cover main body 140 made of a flat metallic plate; and a first elastic engagement portion 141 and a second elastic engagement portion 142 provided on the outer peripheral edge of the image-side cover main body 140. The first elastic engagement portion 141 and the second elastic engagement portion 142 are bend portions obtained by bending protrusions provided on the outer peripheral edge of the image-side cover main body 140 in the +Z direction. The first elastic engagement portion 141 is engaged with a first engagement portion 143 provided in the chassis 97. Accordingly, the chassis 97 is secured to the image-side cover 10. The second elastic engagement portion 142 is engaged with a second engagement portion 144 provided in the second cover 13. Accordingly, the second cover 13 is secured to the image-side cover 10.

The chassis 97 includes the first engagement portions 143 at four positions on the fifth side plate 105 and the sixth side plate 106 opposed to each other in the direction of the first axis R1 and the seventh side plate 107 and the eighth side plate 108 opposed to each other in the direction of the second axis R2. The first elastic engagement portions 141 are disposed at four positions at two ends of the image-side cover main body 140 with respect to the direction of the first axis R1 and at two ends thereof with respect to the direction of the second axis R2 and extend in the Z direction along the fifth side plate 105, the sixth side plate 106, the seventh side plate 107, and the eighth side plate 108. The first engagement portions 143 are recessed portions that are provided on the outer surfaces of the side plates at the above-described four positions and that are recessed inward in the radial direction. The first elastic engagement portion 141 includes an engagement protrusion that protrudes toward the chassis 97 so that the engagement protrusion is engaged with the first engagement portion 143.

The second cover 13 includes: an upper plate portion 150 opposed to the image-side cover 10 in the Z direction; a first side plate 151 extending in the Y direction; and a second side plate 152 and a third side plate 153 extending in parallel in the X direction. The first side plate 151 is coupled to the edge in the +X direction of the upper plate portion 150. As illustrated in FIG. 14, the second cover 13 includes the second engagement portions 144 formed at two positions on the first side plate 151. The second cover 13 includes the cutout portion 145 obtained by cutting out the central portion of the edge in the −Z direction of the first side plate 151 so that the first flexible printed board 6 and the second flexible printed board 7 extend through the cutout portion 145 to outside of the cover 2. The second engagement portions 144 are claw portions provided at two positions in the +Y direction and the −Y direction from the cutout portion 145 and protruding in the +X direction from the first side plate 151. The second engagement portion 144 is engaged with a rectangular engagement hole provided in the second elastic engagement portion 142.

An opening 154 surrounded by the upper plate portion 150, the second side plate 152, and the third side plate 153 is provided at the end in the −X direction of the second cover 13. Hooks 155 protruding from the edge of the upper plate portion 150 in the −X direction are fitted into fitting portions 156 provided in the chassis 97 so that the second cover 13 is coupled to the chassis 97. The hooks 155 and the fitting portions 156 are disposed at two positions apart from each other in the Y-direction. The fitting portion 156 is formed by cutting out the corner portion connecting the frame-shaped plate portion 98 of the chassis 97 with the second side plate 102.

The end in the −X direction of the second cover 13 has the shape that conforms to the second side plate 102 of the chassis 97 and the sixth side plate 106 and the seventh side plate 107 disposed on both sides of the second side plate 102. The edge in the −Y direction of the opening 154 includes a first inclined surface 157 extending along the direction of the seventh side plate 107, and the edge in the +Y direction of the opening 154 includes a second inclined surface 158 extending along the direction of the sixth side plate 106. The first inclined surface 157 is inclined by 45° to one side in the circumferential direction around the optical axis L with respect to the Y direction, and the second inclined surface 158 is inclined by 45° to the other side in the circumferential direction around the optical axis L with respect to the Y direction. The first inclined surface 157 is substantially parallel to the seventh side plate 107, and the second inclined surface 158 is substantially parallel to the sixth side plate 106.

The first cover 12 includes a cover portion 160 that extends to the position where the end thereof in the +X direction covers the end of the second cover 13 in the −X direction so as to cover the coupling area between the chassis 97 and the second cover 13. The surface of the end of the second cover 13 on the side of the chassis 97 (the −X direction) includes a recessed portion 161 that is recessed with the depth substantially equal to the thickness of the first cover 12. Therefore, the cover portion 160 of the first cover 12 is engaged with the recessed portion 161 so that the chassis 97 and the second cover 13 are assembled so as to cover the coupling area therebetween with the cover portion 160.

The second cover 13 includes an engagement protrusion 162 protruding from the recessed portion 161, and the cover portion 160 includes an engagement hole 163 provided at the position overlapped with the engagement protrusion 162. According to this example, the engagement protrusions 162 are provided at two positions on the second side plate 152 and the third side plate 153. Therefore, when the first cover 12 is placed on the chassis 97, the engagement protrusion 162 is engaged with the engagement hole 163 so that the first cover 12 is prevented from being detached in the −X direction. The first cover 12 is secured to the second cover 13 with the engagement structure of the engagement protrusion 162 and the engagement hole 163 and an adhesive in combination, and the cover portion 160 is secured to the recessed portion 161 with an adhesive. The cover portion 160 includes cutout portions 164 obtained by cutting out the end thereof in the +X direction at two positions. As illustrated in FIG. 1, the cutout portion 164 forms a recess serving as an adhesive reservoir.

The first cover 12 includes a frame-shaped cover portion 165 that covers the outer circumference portion of the optical-unit main body 3 from the +Z side. As illustrated in FIG. 1, the imaging module 5 and the gimbal frame 80 protrude through an opening 166 provided in the frame-shaped cover portion 165 in the +Z direction. The first cover 12 is placed on the chassis 97 and, after the cover portion 160 is positioned so as to engage with the recessed portion 161, is secured to the frame-shaped plate portion 98 of the chassis 97 by welding. Therefore, the frame-shaped cover portion 165 includes welding marks 167 at multiple positions overlapped with the frame-shaped plate portion 98 in the Z-direction (see FIG. 1).

Figure 15A:
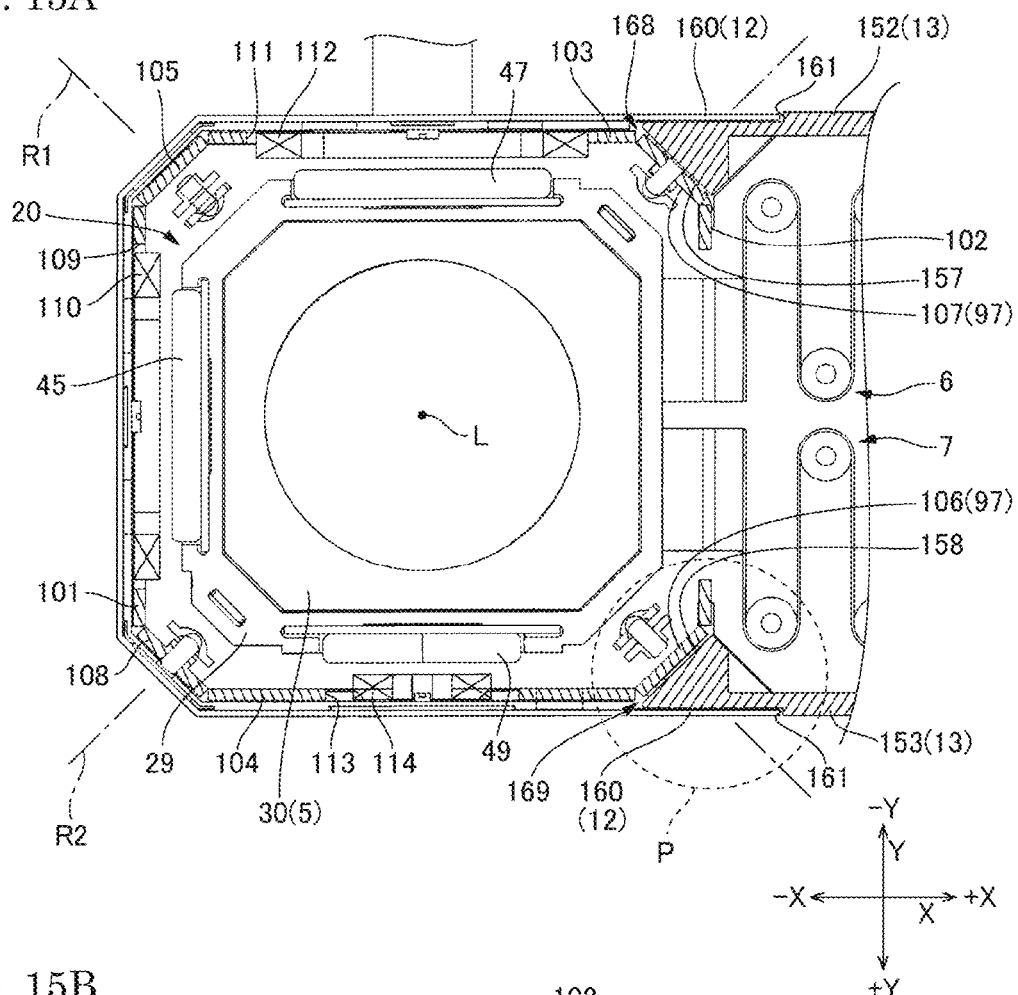
FIG. 15A is a cross-sectional view (the C-C cross-sectional view of FIG. 1) of the optical unit with a shake correction function.
Figure 15B:
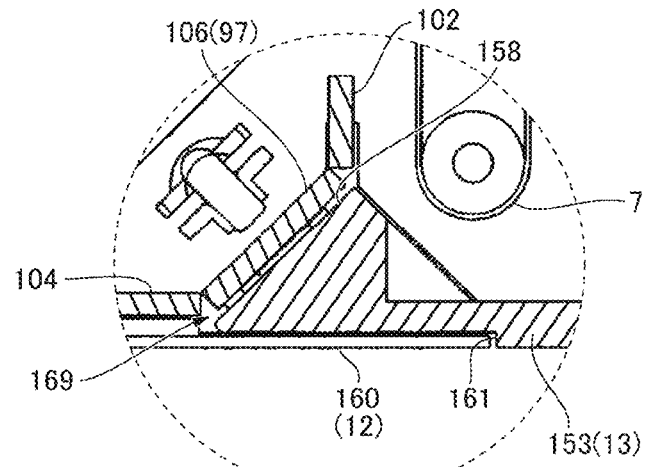
FIG. 15B is a partially enlarged view of a region of FIG. 15A.

FIG. 15A is a cross-sectional view (the C-C cross-sectional view of FIG. 1) of the optical unit 1 with a shake correction function, and FIG. 15B is a partially enlarged view of a region P of FIG. 15A. When the chassis 97 and the second cover 13 are coupled to each other and the coupling area between the chassis 97 and the second cover 13 is covered with the cover portion 160 of the first cover 12, a first labyrinth structure 168 is formed by the area where the cover portion 160 covers the second side plate 152 and the area where the seventh side plate 107 of the chassis 97 is opposed to the first inclined surface 157. Furthermore, a second labyrinth structure 169 is formed by the area where the cover portion 160 covers the third side plate 153 and the area where the sixth side plate 106 of the chassis 97 is opposed to the second inclined surface 158.

The first flexible printed board 6 and the second flexible printed board 7 include securing portions 170 to be secured to the cover 2 (see FIG. 13 and FIG. 14). As described above, the first flexible printed board 6 and the second flexible printed board 7 are secured to the end in the +X direction of the image-side cover 10 via the reinforcing plate 19, and the reinforcing plate 19 and the flexible substrate portion to which the reinforcing plate 19 is secured constitute the securing portions 170. The first flexible printed board 6 and the second flexible printed board 7 include the bend portion 15 that extend in a bended form between the securing portion 170 (the reinforcing plate 19) and the movable body 20. The bend portion 15 is formed to suppress an increase in the rotational load of the movable body 20 around the optical axis L, the rotational load around the first axis R1, and the rotational load around the second axis R2.

Primary Function Effect of this Example

As described above, the optical unit 1 with a shake correction function according to this example includes: the movable body 20 including the lens 4; the gimbal structure 22 that supports the movable body 20 rotatably around the first axis R1 intersecting with the optical axis L of the lens 4 and around the second axis R2 intersecting with the optical axis L and the first axis R1; the securing body 23 that supports the movable body 20 via the gimbal structure 22; and the flexible printed board (the first flexible printed board 6 and the second flexible printed board 7) that extends from the movable body 20 in the first direction (+X direction) intersecting with the optical axis L. The securing body 23 includes: the chassis 97 surrounding the outer circumference side of the movable body 20 and the gimbal frame 80; and the cover 2 housing the chassis 97 and the flexible printed board (the first flexible printed board 6 and the second flexible printed board 7) extending to the side of the chassis 97 in the first direction (+X direction). The flexible printed board (the first flexible printed board 6 and the second flexible printed board 7) includes: the securing portion 170 to be secured to the cover 2; and the bend portion 15 extending in a bended form between the securing portion 170 and the movable body 20.

As described above, according to this example, the first flexible printed board 6 and the second flexible printed board 7 extend from the chassis 97 surrounding the outer circumference side of the movable body 20 and the gimbal structure 22 in the first direction (+X direction) perpendicular to the optical axis L, and the securing body 23 includes the cover 2 that houses not only the chassis 97 but also the bend portions 15 of the first flexible printed board 6 and the second flexible printed board 7 extending to the outer circumference side of the chassis 97. Thus, it is possible to prevent foreign matter from entering the chassis 97.

Furthermore, according to this example, the first flexible printed board 6 and the second flexible printed board 7 include the securing portions 170 secured to the cover 2 and the bend portions 15 extending in a bended form between the securing portion 170 and the movable body 20; thus, it is possible to suppress an increase in the rotational load for rotating the movable body 20 due to the elasticity of the first flexible printed board 6 and the second flexible printed board 7.

The cover 2 according to this example includes: the image-side cover 10 that covers the chassis 97, the first flexible printed board 6, and the second flexible printed board 7 from the image side (the −Z direction) with respect to the direction of the optical axis L; and the object-side cover 11 that covers the chassis 97, the first flexible printed board 6, and the second flexible printed board 7 from the object side (the +Z direction) with respect to the direction of the optical axis L. The object-side cover 11 includes: the first cover 12 covering the chassis 97; and the second cover 13 disposed on the side of the chassis 97 with respect to the first direction (the +X direction) and covering the first flexible printed board 6 and the second flexible printed board 7, and the cover portion 160 is provided at the end of the first cover 12 with respect to the first direction (the +X direction) to cover the coupling position of the chassis 97 and the second cover 13. Thus, it is possible to prevent foreign matter entering from the coupling position of the second cover 13 and the chassis 97.

According to this example, the image-side cover 10 and the first cover 12 are made of a non-magnetic metal, while the second cover 13 is made of a resin. As the end of the second cover 13 on the side of the chassis 97 includes the recessed portion 161 that is recessed with the depth substantially equal to the thickness of the first cover 12, it is possible to make an assembly such that the cover portion 160 of the first cover 12 is engaged with the recessed portion 161. Thus, with the engagement structure in the coupling area between the first cover 12 and the second cover 13, foreign matter does not easily enter from the coupling area between the first cover 12 and the second cover 13.

The cutout portion 164 is formed at the coupling position of the first cover 12 and the second cover 13 by cutting out the edge of the cover portion 160 of the first cover 12 so that the cutout portion 164 forms a recess serving as an adhesive reservoir; thus, when the first cover 12 and the second cover 13 are secured to each other with an adhesive, the adhesive may be placed in the adhesive reservoir.

According to this example, the chassis 97 includes the second side plate 102, the seventh side plate 107, and the sixth side plate 106 disposed on the side to which the second cover 13 is coupled. The second side plate 102 is a central side plate disposed at the center with respect to the Y-direction and oriented in the first direction (the +X direction). The seventh side plate 107 is a first-side side plate disposed on a first side of the second side plate 102 (the center side plate) with respect to the circumferential direction and inclined by 45° to the first side in the circumferential direction with respect to the second side plate 102 (the center side plate). The sixth side plate 106 is a second-side side plate disposed on a second side of the second side plate 102 (the center side plate) with respect to the circumferential direction and inclined by 45° to the second side in the circumferential direction with respect to the second side plate 102 (the center side plate). For the side surfaces of the chassis 97 having the above-described shape, the second cover 13 includes the first inclined surface 157 opposed to the seventh side plate 107 (the first-side side plate) and the second inclined surface 158 opposed to the sixth side plate 106 (the second-side side plate). As described above, as the coupling position of the second cover 13 and the chassis 97 is covered with the cover portion 160, the first labyrinth structure 168 including the area where the seventh side plate 107 (the first-side side plate) is opposed to the first inclined surface 157 and the second labyrinth structure 169 including the area where the sixth side plate 106 (the second-side side plate) is opposed to the second inclined surface 158 are formed at the coupling position of the second cover 13 and the chassis 97. Thus, it is possible to prevent the entry of foreign matter.

According to this example, the image-side cover 10 includes the first elastic engagement portions 141 extending along the side plates (the fifth side plate 105, the sixth side plate 106, the seventh side plate 107, and the eighth side plate 108) of the chassis 97, and the chassis 97 includes the first engagement portions 143 engaged with the first elastic engagement portions 141. As the chassis 97 and the image-side cover 10 are secured to each other by the snap-fit structure, it is easy to secure the image-side cover 10 and the chassis 97. According to this example, the first engagement portion 143 includes the recess and the first elastic engagement portion 141 includes the engagement protrusion; however, the arrangement of the recess and the engagement protrusion may be reversed.

According to this example, the image-side cover 10 includes the second elastic engagement portions 142 extending along the side surface of the second cover 13, and the second cover 13 includes the second engagement portions 144 engaged with the second elastic engagement portion 142. As the second cover 13 and the image-side cover 10 are secured to each other with the snap-fit structure, it is easy to secure the image-side cover 10 and the second cover 13. According to this example, the second engagement portion 144 is a claw portion and the second elastic engagement portion 142 includes the engagement hole; however, the arrangement of the claw portion and the engagement hole may be reversed.

According to this example, the second cover 13 includes the upper plate portion 150 opposed to the image-side cover 10 and the hooks 155 provided on the edge of the upper plate portion 150 on the side of the chassis 97, and the chassis 97 includes the fitting portions 156 into which the hooks 155 are fitted. The hooks 155 are fitted into the fitting portions 156 so that the chassis 97 and the second cover 13 may be coupled to each other; thus, it is easy to couple the chassis 97 and the second cover 13.

Modification

According to the above-described embodiment, the rotation support structure 21 is disposed between the movable body 20 and the gimbal structure 22; however, at least an embodiment of the present invention is also applicable to the configuration from which the rotation support structure 21 and the rolling-correction magnetic drive structure 28 are omitted.

What is claimed is:

1. An optical unit with a shake correction function, comprising:
    a movable body including a lens;
    a gimbal structure to support the movable body rotatably around a first axis intersecting with an optical axis of the lens and rotatably around a second axis intersecting with the optical axis and the first axis;
    a securing body to support the movable body via the gimbal structure; and
    a flexible printed board extending from the movable body in a first direction intersecting with the optical axis, wherein
    the securing body includes:
        a chassis to surround an outer circumference side of the movable body and the gimbal structure; and
        a cover to house the chassis and the flexible printed board extending to a side of the chassis in the first direction,
    the flexible printed board includes:
        a securing portion secured to the cover; and
        a bend portion extending in a bended form between the securing portion and the movable body,
    the cover includes:
        an image-side cover to cover the chassis and the flexible printed board from an image side in a direction of the optical axis; and
        an object-side cover to cover the chassis and the flexible printed board from an object side in the direction of the optical axis,
    the object-side cover includes:
        a first cover to cover the chassis; and
        a second cover disposed on the side of the chassis in the first direction to cover the flexible printed board, and
    an end in the first direction of the first cover includes a cover portion to cover a coupling position of the chassis and the second cover.

2. The optical unit with the shake correction function according to claim 1, wherein
    the image-side cover and the first cover are made of metal,
    the second cover is made of a resin, and
    an end of the second cover, which end is opposite to the chassis, includes a recessed portion that is provided in an area covered with the cover portion and is recessed with a depth substantially equal to a thickness of the first cover.

3. The optical unit with the shake correction function according to claim 2, further comprising an adhesive reservoir provided at a coupling position of the first cover and the second cover, wherein the adhesive reservoir includes a cutout portion formed by cutting out an edge of the cover portion.

4. The optical unit with the shake correction function according to claim 3, wherein
    the image-side cover includes a first elastic engagement portion extending along a side plate of the chassis, and the chassis includes a first engagement portion to engage with the first elastic engagement portion.

5. The optical unit with the shake correction function according to claim 3, wherein the image-side cover includes a second elastic engagement portion extending along a side surface of the second cover, and
the second cover includes a second engagement portion to engage with the second elastic engagement portion.

6. The optical unit with the shake correction function according to claim 3, wherein
the second cover includes:
an upper plate portion facing the image-side cover; and
a hook provided on an edge of the upper plate portion, which edge is opposite to the chassis, and
the chassis includes a fitting portion into which the hook is fitted.

7. The optical unit with the shake correction function according to claim 2, wherein
the chassis includes:
a center side plate facing in the first direction;
a first-side side plate disposed on a first side in a circumferential direction of the center side plate; and
a second-side side plate disposed on a second side in the circumferential direction of the center side plate,
the first-side side plate is inclined to the first side in the circumferential direction with respect to the center side plate,
the second-side side plate is inclined to the second side in the circumferential direction with respect to the center side plate,
the second cover includes a first inclined surface facing the first-side side plate and a second inclined surface facing the second-side side plate, and
an area where the cover portion covers the coupling position of the chassis and the second cover includes:
a first labyrinth structure including an area where the first-side side plate faces the first inclined surface; and
a second labyrinth structure including an area where the second-side side plate faces the second inclined surface.

8. The optical unit with the shake correction function according to claim 2, wherein
the image-side cover includes a first elastic engagement portion extending along a side plate of the chassis, and
the chassis includes a first engagement portion to engage with the first elastic engagement portion.

9. The optical unit with the shake correction function according to claim 2, wherein
the image-side cover includes a second elastic engagement portion extending along a side surface of the second cover, and
the second cover includes a second engagement portion to engage with the second elastic engagement portion.

10. The optical unit with the shake correction function according to claim 2, wherein
the second cover includes:
an upper plate portion facing the image-side cover; and
a hook provided on an edge of the upper plate portion, which edge is opposite to the chassis, and
the chassis includes a fitting portion into which the hook is fitted.

11. The optical unit with the shake correction function according to claim 1, wherein
the chassis includes:
a center side plate facing in the first direction;
a first-side side plate disposed on a first side in a circumferential direction of the center side plate; and
a second-side side plate disposed on a second side in the circumferential direction of the center side plate,
the first-side side plate is inclined to the first side in the circumferential direction with respect to the center side plate,
the second-side side plate is inclined to the second side in the circumferential direction with respect to the center side plate,
the second cover includes a first inclined surface facing the first-side side plate and a second inclined surface facing the second-side side plate, and
an area where the cover portion covers the coupling position of the chassis and the second cover includes:
a first labyrinth structure including an area where the first-side side plate faces the first inclined surface; and
a second labyrinth structure including an area where the second-side side plate faces the second inclined surface.

12. The optical unit with the shake correction function according to claim 1, wherein
the image-side cover includes a first elastic engagement portion extending along a side plate of the chassis, and
the chassis includes a first engagement portion to engage with the first elastic engagement portion.

13. The optical unit with the shake correction function according to claim 12, wherein
the image-side cover includes a second elastic engagement portion extending along a side surface of the second cover, and
the second cover includes a second engagement portion to engage with the second elastic engagement portion.

14. The optical unit with the shake correction function according to claim 12, wherein
the second cover includes:
an upper plate portion facing the image-side cover; and
a hook provided on an edge of the upper plate portion, which edge is opposite to the chassis, and
the chassis includes a fitting portion into which the hook is fitted.

15. The optical unit with the shake correction function according to claim 1, wherein
the image-side cover includes a second elastic engagement portion extending along a side surface of the second cover, and
the second cover includes a second engagement portion to engage with the second elastic engagement portion.

16. The optical unit with the shake correction function according to claim 1, wherein
the second cover includes:
an upper plate portion facing the image-side cover; and
a hook provided on an edge of the upper plate portion, which edge is opposite to the chassis, and
the chassis includes a fitting portion into which the hook is fitted.

* * * * *